(12) United States Patent
Gu et al.

(10) Patent No.: US 9,736,425 B2
(45) Date of Patent: Aug. 15, 2017

(54) METHODS AND SYSTEMS FOR CODED ROLLING SHUTTER

(71) Applicant: Sony Corporation, Tokyo (JP)

(72) Inventors: Jinwei Gu, Rochester, NY (US);
Yasunobu Hitomi, Kanagawa (JP);
Tomoo Mitsunaga, Kanagawa (JP);
Shree K. Nayar, New York, NY (US)

(73) Assignees: Sony Corporation, Tokyo (JP); The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/816,976

(22) Filed: Aug. 3, 2015

(65) Prior Publication Data
US 2015/0341576 A1    Nov. 26, 2015

Related U.S. Application Data

(63) Continuation of application No. 13/504,905, filed as application No. PCT/US2010/054424 on Oct. 28, 2010, now Pat. No. 9,100,514.
(Continued)

(51) Int. Cl.
*H04N 3/14* (2006.01)
*H04N 5/335* (2011.01)
(Continued)

(52) U.S. Cl.
CPC ............. *H04N 7/002* (2013.01); *G06T 5/003* (2013.01); *H04N 5/2329* (2013.01);
(Continued)

(58) Field of Classification Search
CPC .... H04N 5/3535; H04N 5/3532; H04N 5/353; H04N 5/35536; H04N 5/35534;
(Continued)

(56) References Cited

U.S. PATENT DOCUMENTS 3,971,065 A   7/1976   Bayer
4,590,367 A   5/1986   Ross et al.
(Continued)

FOREIGN PATENT DOCUMENTS

DE   4305807   10/1994
DE   4420637   12/1995
(Continued)

OTHER PUBLICATIONS

Office Action dated Dec. 22, 2015 in Japanese Patent Application No. 2013-555637.
(Continued)

*Primary Examiner* — Yogesh Aggarwal
(74) *Attorney, Agent, or Firm* — Wolf, Greenfield & Sacks, P.C.

(57) ABSTRACT

Methods and systems for coded rolling shutter are provided. In accordance with some embodiments, methods and system are provided that control the readout timing and exposure length for each row of a pixel array in an image sensor, thereby flexibly sampling the three-dimensional space-time value of a scene and capturing sub-images that effectively encode motion and dynamic range information within a single captured image.

24 Claims, 25 Drawing Sheets

Related U.S. Application Data

(60) Provisional application No. 61/255,802, filed on Oct. 28, 2009.

(51) Int. Cl.
   *H04N 7/00* (2011.01)
   *H04N 5/374* (2011.01)
   *H04N 5/378* (2011.01)
   *H04N 5/232* (2006.01)
   *H04N 5/235* (2006.01)
   *H04N 5/353* (2011.01)
   *H04N 5/355* (2011.01)
   *G06T 5/00* (2006.01)

(52) U.S. Cl.
   CPC ......... *H04N 5/2353* (2013.01); *H04N 5/3532* (2013.01); *H04N 5/3535* (2013.01); *H04N 5/35554* (2013.01); *H04N 5/374* (2013.01); *H04N 5/378* (2013.01); *H04N 7/00* (2013.01); *G06T 2207/20201* (2013.01)

(58) Field of Classification Search
   CPC .... H04N 5/35581; H04N 7/002; H04N 5/378; H04N 5/374; H04N 7/00; H04N 5/2353; H04N 5/35554; H04N 5/2329; G06T 5/003; G06T 2207/20201
   USPC ................ 348/294, 298, 300, 302, 312, 262
   See application file for complete search history.

(56) References Cited

U.S. PATENT DOCUMENTS

| | | |
|---|---|---|
| 4,623,928 A | 11/1986 | Handy |
| 4,630,307 A | 12/1986 | Cok |
| 4,652,916 A | 3/1987 | Suzaki et al. |
| 4,868,649 A | 9/1989 | Gaudin |
| 4,873,561 A | 10/1989 | Wen |
| 4,918,534 A | 4/1990 | Lam et al. |
| 5,030,985 A | 7/1991 | Bryant |
| 5,138,458 A | 8/1992 | Nagasaki et al. |
| 5,185,671 A | 2/1993 | Lieberman et al. |
| 5,193,016 A | 3/1993 | Cornuejols |
| 5,282,063 A | 1/1994 | Deacon et al. |
| 5,309,243 A | 5/1994 | Tsai |
| 5,373,322 A | 12/1994 | Laroche et al. |
| 5,420,635 A | 5/1995 | Konishi et al. |
| 5,455,621 A | 10/1995 | Morimura |
| 5,629,734 A | 5/1997 | Hamilton et al. |
| 5,638,118 A | 6/1997 | Takahashi et al. |
| 5,638,119 A | 6/1997 | Cornuejols |
| 5,670,280 A | 9/1997 | Lawandy |
| 5,696,848 A | 12/1997 | Patti et al. |
| 5,703,677 A | 12/1997 | Simoncelli et al. |
| 5,767,987 A | 6/1998 | Wolff et al. |
| 5,789,737 A | 8/1998 | Street |
| 5,801,773 A | 9/1998 | Ikeda et al. |
| 5,828,793 A | 10/1998 | Mann |
| 5,889,554 A | 3/1999 | Mutze |
| 5,990,952 A | 11/1999 | Hamazaki |
| 6,122,408 A | 9/2000 | Fang et al. |
| 6,124,974 A | 9/2000 | Burger |
| 6,501,504 B1 | 12/2002 | Tatko et al. |
| 6,690,422 B1 | 2/2004 | Daly et al. |
| 6,753,909 B1 | 6/2004 | Westerman et al. |
| 6,809,761 B1 | 10/2004 | Tamaru |
| 6,864,916 B1 | 3/2005 | Nayar et al. |
| 6,922,209 B1 | 7/2005 | Hwang et al. |
| 7,084,905 B1 | 8/2006 | Nayar et al. |
| 7,304,771 B2 | 12/2007 | Walmsley et al. |
| 7,428,019 B2 | 9/2008 | Irani et al. |
| 7,511,643 B2 | 3/2009 | Baraniuk et al. |
| 7,525,583 B2 | 4/2009 | Kimbell |
| 7,612,822 B2 | 11/2009 | Ajito et al. |
| 7,639,289 B2 | 12/2009 | Agrawal et al. |
| 7,697,778 B2 | 4/2010 | Steinberg et al. |
| 7,924,321 B2 | 4/2011 | Nayar et al. |
| 7,986,857 B2 | 7/2011 | Kim et al. |
| 7,999,858 B2 | 8/2011 | Nayar et al. |
| 8,068,153 B2 | 11/2011 | Kumar et al. |
| 8,248,496 B2 | 8/2012 | Sekine |
| 8,797,433 B2 | 8/2014 | Kaizu et al. |
| 8,798,395 B2 | 8/2014 | Jo |
| 8,803,985 B2 | 8/2014 | Kaizu et al. |
| 8,848,063 B2 | 9/2014 | Jo et al. |
| 8,933,924 B2 | 1/2015 | Sato |
| 9,036,060 B2 | 5/2015 | Kaizu et al. |
| 9,060,134 B2 | 6/2015 | Mitsunaga |
| 9,100,514 B2 | 8/2015 | Gu et al. |
| 9,124,809 B2 | 9/2015 | Kaizu et al. |
| 9,344,637 B2 | 5/2016 | Kasai et al. |
| 9,357,137 B2 | 5/2016 | Mitsunaga |
| 2002/0050518 A1 | 5/2002 | Roustaei |
| 2003/0076423 A1 | 4/2003 | Dolgoff |
| 2003/0108101 A1 | 6/2003 | Frossard et al. |
| 2003/0160875 A1 | 8/2003 | Kobayashi et al. |
| 2006/0221067 A1 | 10/2006 | Kim et al. |
| 2006/0291844 A1 | 12/2006 | Kakkori |
| 2007/0030342 A1 | 2/2007 | Wilburn et al. |
| 2007/0103595 A1 | 5/2007 | Gong et al. |
| 2007/0104382 A1 | 5/2007 | Jasinschi |
| 2007/0223059 A1 | 9/2007 | Oishi |
| 2008/0002043 A1 | 1/2008 | Inoue et al. |
| 2008/0219655 A1 | 9/2008 | Yoon et al. |
| 2008/0278610 A1* | 11/2008 | Boettiger ............ H04N 5/2253 348/273 |
| 2008/0316862 A1 | 12/2008 | Bernecky et al. |
| 2009/0257653 A1 | 10/2009 | Ashikaga |
| 2010/0026819 A1* | 2/2010 | Koh .................... H04N 5/23212 348/208.4 |
| 2010/0141263 A1 | 6/2010 | Nakamura |
| 2010/0309333 A1* | 12/2010 | Smith .................... H04N 5/235 348/230.1 |
| 2012/0218426 A1 | 8/2012 | Kaizu et al. |
| 2012/0281111 A1 | 11/2012 | Jo et al. |
| 2012/0287294 A1 | 11/2012 | Kaizu et al. |
| 2012/0314124 A1 | 12/2012 | Kaizu et al. |
| 2013/0033616 A1 | 2/2013 | Kaizu et al. |
| 2013/0050177 A1 | 2/2013 | Sato |
| 2013/0050284 A1 | 2/2013 | Sato |
| 2013/0050520 A1 | 2/2013 | Takeuchi |
| 2013/0051700 A1 | 2/2013 | Jo |
| 2013/0308044 A1 | 11/2013 | Mitsunaga |
| 2013/0329128 A1 | 12/2013 | Kaizu et al. |
| 2014/0192235 A1 | 7/2014 | Hitomi et al. |
| 2014/0192250 A1 | 7/2014 | Mitsunaga |
| 2014/0267828 A1 | 9/2014 | Kasai et al. |
| 2014/0313400 A1 | 10/2014 | Kaizu et al. |
| 2014/0321766 A1 | 10/2014 | Jo |
| 2014/0340550 A1 | 11/2014 | Kaizu et al. |
| 2014/0368697 A1 | 12/2014 | Jo et al. |
| 2015/0312463 A1 | 10/2015 | Gupta et al. |
| 2015/0341576 A1 | 11/2015 | Gu et al. |
| 2016/0248956 A1 | 8/2016 | Mitsunaga |

FOREIGN PATENT DOCUMENTS

| | | |
|---|---|---|
| DE | 19618476 | 11/1997 |
| EP | 1729524 | 12/1899 |
| EP | 0472299 | 12/2006 |
| GB | 2255465 | 11/1992 |
| GB | 2331426 | 5/1995 |
| JP | 59217358 | 12/1984 |
| JP | 6070225 | 3/1992 |
| JP | 6141229 | 5/1994 |
| JP | 7077700 | 3/1995 |
| JP | 7115643 | 5/1995 |
| JP | 7254965 | 10/1995 |
| JP | 7254966 | 10/1995 |
| JP | 7264488 | 10/1995 |
| JP | 8154201 | 6/1996 |
| JP | 8223491 | 8/1996 |
| JP | 8331461 | 12/1996 |
| JP | 8340486 | 12/1996 |

(56) References Cited

FOREIGN PATENT DOCUMENTS

| | | |
|---|---|---|
| JP | 10069011 | 3/1998 |
| JP | 10270673 | 10/1998 |
| JP | 2003009006 | 1/2003 |
| JP | 2006033381 | 2/2006 |
| JP | 2006166294 | 6/2006 |
| JP | 2007027604 | 1/2007 |
| JP | 2008035278 | 5/2008 |
| JP | 2009177332 | 6/2009 |
| WO | WO 9001844 | 2/1990 |
| WO | WO 9314595 | 7/1993 |
| WO | WO 9705742 | 2/1997 |

OTHER PUBLICATIONS

Office Action dated Dec. 17, 2015 in U.S. Appl. No. 14/001,139.
Agrawal, A. et al., "Optimal Coded Sampling for Temporal Super-Resolution", In IEEE Conference on Computer Vision and Pattern Recognition (CVPR), Jun. 13-18, 2010, pp. 599-606.
Aharon, M. et al., "K-SVD: An Algorithm for Designing Overcomplete Dictionaries for Sparse Representation", In IEEE Transactions on Signal Processing, vol. 54, No. 11, Nov. 2006, pp. 4311-4322.
Ait-Aider, O. and Berry, F., "Structure and Kinematics Triangulation with a Rolling Shutter Stereo Rig", In Proceedings of IEEE International Conference on Computer Vision (ICCV '09), Kyoto, JP, Sep. 29-Oct. 2, 2009, pp. 1835-1840.
Ait-Aider, O. et al., "Kinematics from Lines in a Single Rolling Shutter Image", In Proceedings of IEEE Conference on Computer Vision and Pattern Recognition (CVPR '2007, Minneapolis, MN, US, Jun. 17-22, 2007, pp. 1-6.
Ait-Aider, O. et al., "Simultaneous Object Pose and Velocity Computation using a Single View from a Rolling Shutter Camera", In Proceedings of European Conference on Computer Vision (ECCV '06, Graz, AT, May 7-13, 2006, pp. 56-68.
Baker, S. et al., "A Database and Evaluation Methodology for Optical Flow", In Proceedings of IEEE International Conference on Computer Vision (ICCV '07), Rio de Janeiro, BR, Oct. 14-20, 2007, pp. 1-8.
Baone, G.A. and Qi, H., "Demosaicking Methods for Multispectral Cameras Using Mosaic Focal Plane Array Technology", In Proceedings of SPIE, the International Society for Optical Engineering, vol. 6062, Jan. 15, 2006, pp. 1-13.
Ben-Ezra, M., et al., "Penrose Pixels: Super-Resolution in the Detector Layout Domain", In IEEE International Conference on Computer Vision (ICCV), Oct. 14-21, 2007, pp. 1-8.
Ben-Ezra, M., "Segmentation with Invisible Keying Signal", In the Proceedings of the Conference on Computer Vision and Pattern Recognition, vol. 1, Jun. 13-15, 2000, pp. 32-37.
Bradley, D. et al., "Synchronization and Rolling Shutter Compensation for Consumer Video Camera Arrays", In IEEE International Workop on Projector-Camera Systems (PROCAMS '09), Miami, FL, US, Jun. 20-25, 2009, pp. 1-8.
Brajovi. V. and Kanade, T., "A Sorting Image Sensor: An Example of Massively Parallel Intensity-to-Time Processing for Low-Latency Computational Sensors", In Proceedings of IEEE Conference on Robotics and Automaton, Minneapolis, MN, US, Apr. 22-28, 1996, pp. 1638-1643.
Bruckstein, A. et al., "From Sparse Solutions of Systems of Equations to Sparse Modeling of Signals and Images", In SIAM Review, vol. 51, No, 1. Feb. 2009, pp. 34-81.
Bub, G. et al., "Temporal Pixel Multiplexing for Simultaneous High-Speed, High-Resolution Imaging", Nature Methods, vol. 7, No. 3, Feb. 14, 2010, pp. 209-211.
Burt, P. and Adelson, E., "A Multiresolution Spline with Application to Image Mosaics", In ACM Transactions on Graphics, vol. 2, No. 4, Oct. 1983, pp. 217-236.
Burt, P. and Kolczynski, R., "Enhanced Image Caputre through Fusion", In Proceedings of International Conference on Computer Vision (ICCV), Berlin, DE, May 11-14, 1993, pp. 173-182.

Candes, E. and Romberg, J., "Sparsity and Incoherence in Compressive Sampling", In Inverse Problems, vol. 23, No, 3, Jun. 2007. pp. 969-985.
Cantles, E. and Tao, T., "Near-Optimal Signal Recovery from Random Projections: Universal Encoding Strategies?", In IEEE Transactions on Information Theory, vol. 59, No. 12, Dec. 2006, pp. 5406-5425.
Candes, E. et al., "Stable Signal Recovery from Incomplete and Inaccurate Measurements", Communication on Pure and Applied Mathematics, vol. 59, No. 8. Aug. 2006, pp. 1207-1223.
Chang, Y.-C. and Reid, J.F., "RGB Calibration for Analysis in Machine Vision", In IEEE Transactions on Pattern Analysis and Machine Intelligence, vol. 5, No. 10, Oct. 1996, pp. 1414-1422.
Chen, T. et al., "How Small Should Pixel Size Be?", In Proceedings of SPIE, vol. 3965, Apr. 2000, pp. 451-459.
Chi, C. and Ben-Ezra, M., "Spectral Probing: Multi-Spectral Imaging by Optimized Wide Band Illumination", In Proceedings of the First International Workshop on Photometric Analysis For Computer Vision (PACV '07), Rio de Janeiro, BR, Oct. 2007, pp. 1-8.
Dabov, K. et al., "Image Denoising by Sparse 3D Transform-Domain Collaboration Filtering", In IEEE Transactions on Image Processing, vol. 16, No. 8, Aug. 2007, pp. 2080-2095.
Debevec, P. and Malik, J., "Recovering High Dynamic Range Radiance Maps from Photographs", In Proceedings of ACM SIGGRAPH, Los Angeles, CA, US, Aug. 5-7, 1997, pp. 369-378.
Donoho. D. et al., "Compressed Sensing", In IEEE Transactions on Information Theory, vol. 52, No. 4, Apr. 2006, pp. 1289-1306.
Donoho, D. et al., "Stable Recovery of Sparse Overcomplete Representations in the Presence of Noise", In IEEE Transactions on Information Theory, vol. 52, No. 1, Jan. 2006, pp. 6-18.
Elad. M. and Aharon, M., "Image Denoising via Learned Dictionaries and Sparse Representation", In IEEE Computer Society Conference on in Computer Vision an Pattern Recognition (CVPR), Jun. 17-22, 2006, pp. 895-900.
Fife, K., et al., "A 0.5 μm Pixel Frame-Transfer CCD Image Sensor in 110nm CMOS", In IEEE International Electron Devices Meeting (IEDM 2007), Dec. 10-12, 2007, pp. 1003-1006.
Fife, K., et al., "A 3MPixel Multi-Aperture Image Sensor with 0.7μm Pixels in 0.11μm CMOS", In Proceedings in the IEEE International Solid-State Circuit Conference: Digest of Technical Papers (ISSCC '08), Feb. 3-8, 2008, pp. 48-50.
Fossum. E.R., "CMOS Image Sensors: Electronic Camera-on-a-Chip", In international Electron Devices Meeting, Washington D.C., US, Dec. 10-13, 1995, pp. 17-25.
Fujifilm, "Fujifilm Announces Super CCD EXR", Press Release, Sep. 22, 2008, pp. 1-5, available at: http://www.dpreview.com/news/0809/08092210fujifilmexr.asp.
Gallo, O. et al., "Artifact-Free High Dynamic Range Imaging", In Proceedings of IEEE International Conference on Computational Photography (ICCCP '09), San Francisco, CA, US, Apr. 16-17, 2009. pp. 1-7.
Gamal, A. and Eltoukhy, H., "CMOS Image Sensors", In IEEE Circuits and Devices Magazine, vol. 5, May 2005, pp. 6-20.
Geyer, C. et al., "Geometric Models of Rolling-Shutter Cameras", In IEEE Workshop on Omnidirectional Vision, Oct. 21, 2005, pp. 1-8.
Gu, J. et al., "Coded Rolling Shutter Photography: Flexible Space-Time Sampling", In IEEE International Conference on Computational Photography (ICCP '10), Cambridge, MA, US, Mar. 29-30, 2010, pp. 1-8.
Gu, J. et al., "Compressive Structured Light for Recovering Inhomogeneous Participating Media", In Proceedings of European Conference on Computer Vision (ECCV '08), Marseille, FR, Oct. 12-18, 2008, pp. 845-858.
Gupta, A. et al., "Enhancing and Experiencing Spacetime Resolution with Videos and Stills", In International Conference on Computational Photography (ICCP '09), San Francisco, CA, US, Apr. 16-17, 2009, pp. 1-9.
Gupta, M. et al., "Flexible Voxels for Motion-Aware Videography", In Proceedings of the 11th European Conference on Computer Vision: Part 1 (ECCV'10), Crete, GR, Sep. 5-11, 2010, pp. 100-114.

(56) References Cited

OTHER PUBLICATIONS

Hirakawa, K. and Parks, T.W., "Adaptive Homogeneity-Directed Demosaicing Algorithm", In IEEE International Conference on Image Processing, vol. 3, Sep. 14-17, 2003, pp. 669-672.
International Patent Application No. PCT/US2000/014515, filed May 26, 2000
International Patent Application No. PCT/US2009/038510, filed Mar. 27, 2009.
International Patent Application No. PCT/US2012/026816, filed Feb. 27, 2012.
International Preliminary Report on Patentability dated Oct. 7, 2010 in International Patent Application No. PCT/US2009/038510.
International Preliminary Report on Patentability dated May 1, 2012 in International Patent Application No. PCT/US2010/054424.
International Preliminary Report on Patentability dated Sep. 6, 20013 in International Patent Application No. PCT/US2012/026816.
International Search Report dated Dec. 21, 2010 in International Patent Application No. PCT/US2010/054424.
International Search Report dated Apr. 12, 2000 in International Patent Application No. PCT/US2000/014515.
International Search Report dated May 23, 2012 in International Patent Application No. PCT/US2012/026816.
International Search Report dated May 27, 2009 in International Patent Application No. PCT/US2009/038510.
Kapur, J.P., "Face Detection in Color images", Technical Report (EE499), Department of Electrical Engineering, University of Washington, Spring 1997, pp. 1-6.
Kemeny, S. et al., "Multiresoution Image Ssensor", In IEEE Transactions on Circuits and Systems for Video Technology, vol. 7, No. 4, Aug. 1997, pp. 575-583.
Kimmel, R., "Demosaicing: Image Reconstruction from Color CCD Samples", In IEEE Transactions on Image Processing, vol. 8, No. 9, Sep. 1999, pp. 1221-1228.
Kleinfelder, S. et al., "A 10.000 Frames/s CMOS Digital Pixel Sensor", IEEE Journal of Solid-Stale Circuits, vol. 36, No. 12, Dec. 2001, pp. 2049-2059.
Levin, A. et al., "image and Depth from a Conventional Camera with a Coded Aperture", In ACM Transactions on Graphics (TOG)—Proceedings of ACM SIGGRAPH '07, vol. 26, No. 3, Jul. 2007, pp, 1-9.
Liang, C.-K. et al., "Analysis and Compensation of Rolling Shutter Effect", In IEEE Transations on Image Processing, vol, 17, No. 8, Jun. 2008, pp. 1323-1330.
Liu, X. and Gamal, A., "Synthesis of High Dynamic Range Motion Blur Free Image from Multiple Captures", In IEEE Transactions on Circuits and Systems—I: Fundamental Theory and Application, vol. 50. No. 4, Apr. 2003, pp. 530-539.
Lu, P.-Y. et al., "High Dynamic Range Image Reconstruction from Hand-Held Cameras", In Proceedings of IEEE Conference on Computer Vision and Pattern Recognition (CVPR '09), Miami, FL, US, Jun. 20-25, 2009, pp. 509-516.
Lu, W. and Tan, Y.P., "Color Filter Army Demosaicking: New Method and Performance Measures", In IEEE Transactions on Image Processing, vol. 12, No. 10, Oct. 2003, pp. 1194-1210.
Lyon, R. and Hubel, P., "Eyeing the Camera: Into the Next Century", In the IS&T Reporter, vol. 17, No. 6, Dec. 2002, pp. 1-7.
Madden, B. C., "Extended Intensity Range Imaging", Technical Report MS-CIS-93-96, Grasp Laboratory, University of Pennsylvania, Dec. 1993, pp. 1-21.
Mairal, J. et al., "Learning Multiscale Sparse Representations for Image and Video Restoration", Technical Support, 2007, pp. 214-241.
Mairal, J. et al., "Non-Local Sparse Models for Image Restoration", In IEEE 12th International Conference on Computer Vision (ICCV), Sep. 29-Oct. 2, 2009, pp. 2272-2279.
Mann. S. and Picard, R.W., "On Being 'Undigital' with Digital Cameras: Extending Dynamic Range by Combining Differently Exposed Pictures", In Proceedings of Society for Imaging Science and Technology's 48th Annual Conference (IS&T '95), Washington DC, US, May 1995, pp. 442-448.
Mannami, H. et al., "Adaptive Dynamic Range Camera with Reflective Liquid Crystal", In Journal of Visual Communication and Image Representation, vol. 18, No. 5, Oct. 2007, pp. 359-365.
Marcia. R.F. and Willett, R.M., "Compressive Coded Aperture Video Reconstruction", In European Signal Processing Conference (EUSIPCO '08), Lausanne, CH, Aug. 25-29, 2008, pp. 1-5.
Mase, M. et al., "A Wide Dynamic Range CMOS Image Sensor with Multiple Exposure-Time Signal Outputs and 12-hit Column-Parallel Cyclic A/D Converters", In IEEE Journal of Solid-State Circuits, vol. 40, No. 12, Dec. 2005, pp. 2787-2795.
Milgram, D., "Computer methods for creating photomosaics", In IEEE Transactions on Computers, vol c-24, No. 5, May 1975, pp. 1113-1119.
Mitsunaga, T. and Nayar, S., "Radiometric Self Calibration", In Proceedings of IEEE Conference on Computer Vision and Pattern Recognition (CVPR), Fort Collins, CO, US, Jun. 23-25, 1999, pp. 374-380.
Nagahara, H. et al., "Programmable Aperture Camera Using LCoS", In Proceedings of the 11th European Conference on Computer Vision: Part VI (ECCV'10), Crete, GR, Sep. 5-11, 2010, pp. 337-350.
Nakamura, J., "Image Sensors and Signal Processingfor Digital Still Cameras", CRC Press, Sep. 2005, pp. 1-322.
Narasimhan, S G. and Nayar, S.K., "Enhancing Resolution Along Multiple Imaging Dimensions Using Assorted Pixels", In IEEE Transactions on Pattern Analysis and Machine Intelligence (PAMI), vol. 27, No. 4, Apr. 2005, pp. 518-530.
Nayar, S.K. and Branzoi, V., "Adaptive Dynamic Range Imaging: Optical Control of Pixel Exposures Over Space and Time", In the International Conference on Computer Vision (ICCV '03), Nice, FR, Oct. 13-16, 2003, pp. 1168-1175.
Nayar, S.K. and Mitsunaga, T., "High Dynamic Range Imaging: Spatially Varying Pixel Exposures", In Proceedings of IEEE Conference on Computer Vision and Pattern Recognition (CVPR '00), Hilton Head Island, SC, US, Jun. 15, 2000, pp. 472-479.
Nayar, S.K. et al., "Programmable Imaging: Towards a Flexible Camera", In International Journal of Computer Vision, vol. 70, No. 1, Oct. 2006, pp. 7-22.
Ng, R. et al., "Light Field Photography with a Hand-Held Plenoptic Camera", Technical Report CSTR Feb. 2005, Stanford University, Feb. 2005, pp. 1-11.
Notice of Allowance dated May 23, 2014 in U.S. Appl. No. 12/736,333.
Nyquist, H., "Certain Topics in Telegraph Transmission Theory", In Proceedings of the IEEE, vol. 90, No. 2, Feb. 2002, pp. 280-305.
Office Action dated Oct. 17, 2013 in U.S. Appl. No. 12/736,333.
Office Action dated Oct. 17, 2014 in Japanese Patent Application No. 2012-537033.
Office Action dated Oct. 24, 2003 in U.S. Appl. No. 09/326,422.
Office Action dated Oct. 8, 2009 in U.S. Appl. No. 10/886,746.
Office Action dated Nov. 13, 2012 in Japanese Patent Application No. 2010-219490.
Office Action dated Dec. 8, 2010 in European Patent Application No. 00936324.3.
Office Action dated Feb. 14, 2012 in European Patent Application No. 09724220.0.
Office Action dated Feb. 20, 2007 in European Patent Application No. 00936324.3.
Office Action dated Feb. 25, 2009 in U.S. Appl. No. 10/886,746.
Office Action dated Feb. 25, 2013 in U.S. Appl. No. 12/736,333.
Office Action dated Mar. 15, 2011 in European Application No. 09724220 0.
Office Action dated Mar. 31, 2004 in U.S. Appl. No. 09/326,422.
Office Action dated May 18, 2015 in Japanese Patent Application No. 2012-537033.
Office Action dated May 22, 2015 in U.S. Appl. No. 14/546,627.
Office Action dated May 27, 2015 in U.S. Appl. No. 14/001,139.
Office Action dated Jun. 29, 2010 in Japanese Patent Application No. 2009-297250.
Office Action dated Jun. 30, 2009 in Japanese Patent Application No. 2001-504676.

(56) References Cited

OTHER PUBLICATIONS

Office Action dated Jul. 30, 2013 in Japanese Patent Application No. 2011-502091.
Office Action dated Jul. 8, 2013 in U.S. Appl. No. 13/045,270.
Office Action dated Sep. 15, 2014 in U.S. Appl. No. 13/504,905.
Office Action dated Sep. 2, 2014 in Japanese Patent Application No. 2011-502091.
Park, J. Y. "A Multiscale Framework for Compressive Sensing of Video", In Proceedings of the 27th conference on Picture Coding Symposium (PCS'09), Chicago, IL, US, May 6-8, 2009, pp. 197-200.
Park, J.I. et al., "Multispectral Imaging Using Multiplexed Illumination", In Proceedings of the IEEE International Conference an Computer Vision (ICCV '07), Rio de Janeiro, BR, Oct. 14-21, 2007, pp. 1-8.
Parkkinen, J.P.S. et al., "Characteristic Spectra of Munsell Colors", In Journal of the Optical Society of America A: Optics. Image Science, and Vision, vol. 6, No. 2, Feb. 1989, pp. 318-322.
Pati, Y.C. et al., "Orthogonal Matching Pursuit: Recursive Function Approximation with Applications to Wavelet Decomposition", In Conference Record of the 27th Asilomar Conference on Signals, Systems, and Computers, vol. 1, Nov. 1993, pp. 40-44.
Pattanaik, S.N. et al., "A Multiscale Model of Adaptation and Spatial Vision for Realistic Image Display", In Proceedings of the 25th Annual Conference on Computer Graphics (SIGGRAPH '98), Orlando, FL, US, Jul. 19-24, 1998, pp. 278-298.
Peers, P. et al., "Compressive Light Transport Sensing", In ACM Transations on Graphics, vo. 28, No. 1, Jan. 2009, pp. 1289-1306.
Peleg, S. and Herman. J., "Panoramic Mosaics by Manifold Projection", In Proceedings of IEEE Conference on Computer Vision and Pattern Recognition (CVPR 97), San Juan, Puerto Rico, US, Jun. 17-19, 1997, pp. 338-343.
Protter, M. and Elad, M., "Image Sequence Denoising via Sparse and Redundant Representations", In IEEE Transactions on Image Processing, vol. 18, No. 1, Jan. 2009, pp. 27-35.
Quan, S. et al., "Unified Measure of Goodness and Optimal Design of Spectral Sensitivity Functions", In Journal of Imaging Science and Technology, vol. 46, No. 6, Nov./Dec. 2002, pp. 485-497.
Raskar, R. et al., "Coded Exposure Photography Motion Deblurring Using Fluttered Shutter", In Proceedings of ACM SIGGRAPH 2006, vol. 25, No. 3, Jul. 2006, pp. 795-804.
Reddy, D., "P2C2: Programmable Pixel Compressive Camera for High Speed Imaging", In Proceedings of the 24th IEEE Conference on Computer Vision and Pattern Recognition (CVPR '11), Colorado Springs, CO, US, Jun. 20-25, 2011, pp. 329-336.
Rubinstein, R. et al., "Dictionaries for Sparse Representation Modeling", In Proceedings of the IEEE, vol. 98, No. 6., Jun. 2010, pp. 1045-1057.
Sankaranarayanan, A. et al., "Compressive Acquisition of Dynamic Scenes", In Proceedings of the 11th European Conference on Computer Vision: Part I (ECCV'10), Crete, GR, Sep. 5-11, 2010, pp. 129-142.
Savard, J., "Color Filter Array Designs", In Quadibloc, Feb. 19, 2006, pp. 1-18.
Sharma, G. and Trussell, H.J., "Figures of Merit for Color Scanners", In IEEE Transactions on Image Processing, vol. 6, No. 7, Jul. 1997, pp. 990-1001.
Shogenji, R., et al., "Multispectral Imaging Using Compact Compound Optics", In Optics Express, vol, 12, No. 8, Apr. 19, 2004, pp. 1643-1655.
Tropp, J.A. and Gilbert, A.C., "Signal Recovery from Random Measurements via Orthogonal Matching Pursuit", In IEEE Transactions on Information Theory, vol. 53, No. 12, Dec. 2007, pp. 4655-4666.
Tropp, J.A., "Just Relax: Convex Programming Methods for Subset Selection and Sparse Approximation", Technical Report, California Institute of Technology, 2004. pp. 1-39.
U.S. Appl. No. 09/326,422, filed Jun. 4, 1999.
U.S. Appl. No. 10/886,746, filed Jul. 7, 2004.
U.S. Appl. No. 12/736,333, filed May 11, 2011.
U.S. Appl. No. 13/045,270, filed Mar. 10, 2011.
U.S. Appl. No. 61/072,301, filed Mar. 28, 2008.
U.S. Appl. No. 61/194,725, filed Sep. 30, 2006.
U.S. Appl. No. 61/446,970, filed Feb. 25, 2011.
Veeraraghavan, A. et al., "Coded Strobing Photography. Compressive Sensing of High-Speed Periodic Events", In IEEE Transactions on Pattern Analysis and Machine Intelligence, vol. 33, No. 4, Apr. 2011, pp. 671-686.
Veeraraghavan, A. et al., "Dappled Photography: Mask Enhanced Cameras for Heterodyned Light Fields and Coded Aperture Refocusing". In Journal for ACM Transactions on Graphics (TOG)—Proceedings of ACM SIGGRAPH '07, vol. 26, No. 3, Jul. 2007, pp. 1-12.
Wakin, M.B. et al., "Compressive Imaging for Video Representation and Coding", in Proceedings of Picture Coding Symposium (PCS), Beijing, CN, Apr. 24-26, 2006, pp. 1-6.
Wilburn, B. et al., "High Speed Video Using a Dense Camera Array", In Proceedings of the 2004 IEEE Computer Society Conference on Computer Vision and Pattern Recognition (CVPR'04), Washington, D.C., US, Jun. 27-Jul. 2, 2004, pp. 294-301.
Written Opinion dated Dec. 21, 2010 in International Patent Application No. PCT/US2010/054424.
Written Opinion dated Mar. 13, 2002 in International Patent Application No. PCT/US2000/014515.
Written Opinion dated May 23, 2012 in International Patent Application No. PCT/US2012/026816.
Written Opinion dated May 27, 2009 in International Patent Application No. PCT/US2009/038510.
Yedid-Pecht, O. and Fossum, E., "Wide Intrascene Dynamic Range CMOS APS using Dual Sampling", In IEEE Transcations on Electron Devices, vol. 44, No. 10, Oct. 1997, pp. 1721-1723.
Yamada, K. et al., "Effectiveness of Video Camera Dynamic Range Expansion for Lane Mark Detection", In Proceedings of the IEEE Conference on Intelligent Transportation System (ITSC '97), Boston, MA, US, Nov. 9-12, 1997, pp. 584-588.
Yang, D.X.D. et al., "A 640 X 512 CMOS Image Sensor with Ultrawide Synamic Range Floating-Point Pixel-Level ADC", In IEEE Journal of Solid-State Circuits, vol. 34, No. 12, Dec. 1999, pp. 1521-1834.
Yoshihara, S. et el., "A ¼.8-inch 6.4mpixel 60 frames/s CMOS Image Sensor with Seamless Mode Change", In IEEE International Solid-State Circuits Conference (ISSCC), vol. 41, No. 12, Dec. 2006, pp. 2995-3006.
Yoshimura, S. et al., "A 48K frames/S CMOS Image Sensor for Real-Time 3-D Sensing and Motion Detection". In IEEE International Solid-State Circuits Conference (ISSCC), vol. 436, Feb. 2001, pp. 94-95.
Yuan, L. et al., "Image Deblurring with Blurred and Noisy Image Pairs", In ACM Transations on Graphics (SIGGRAPH '07) vol. 26. No. 3, Jul. 2007, pp. 1-10.

* cited by examiner

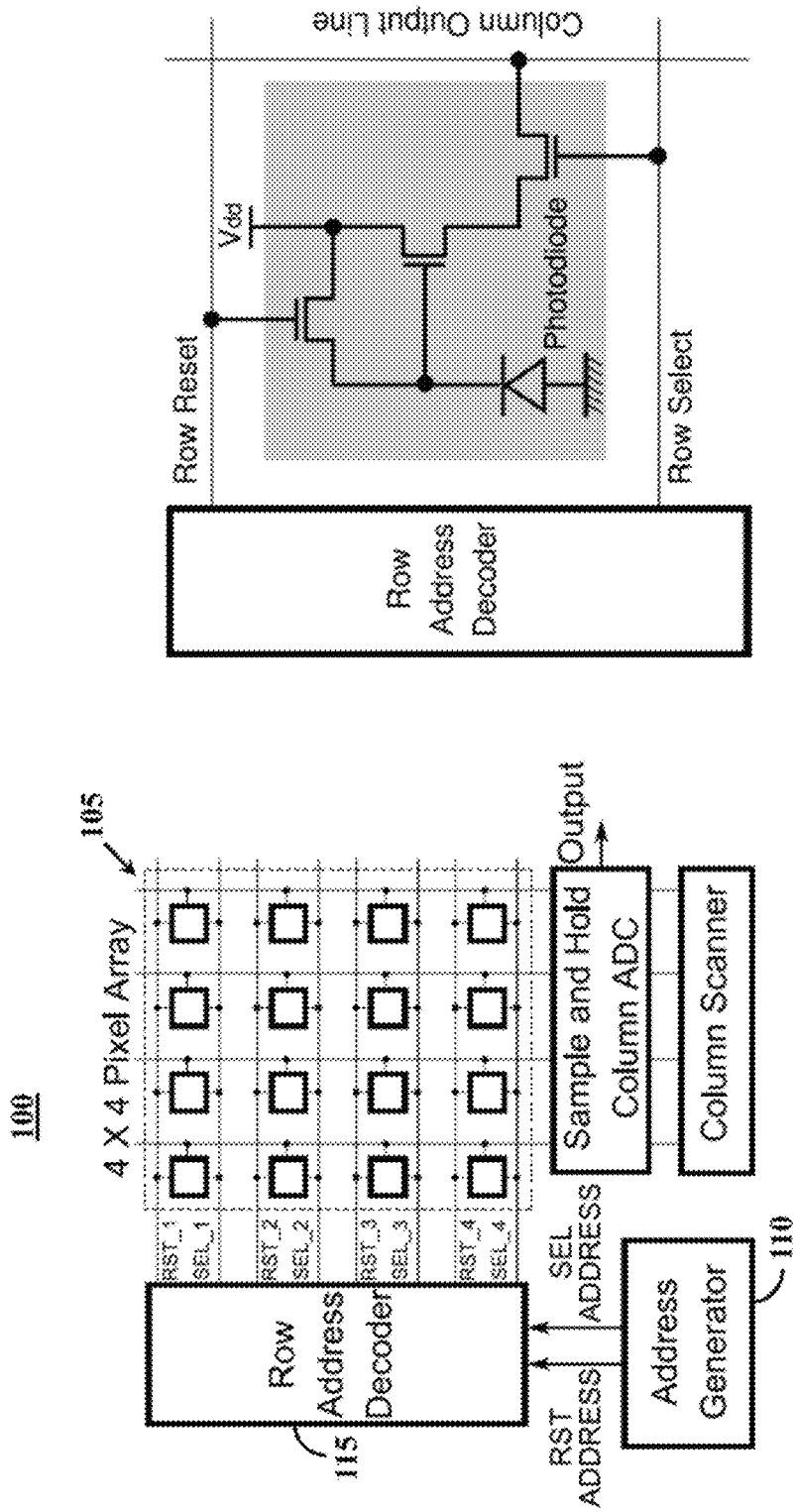

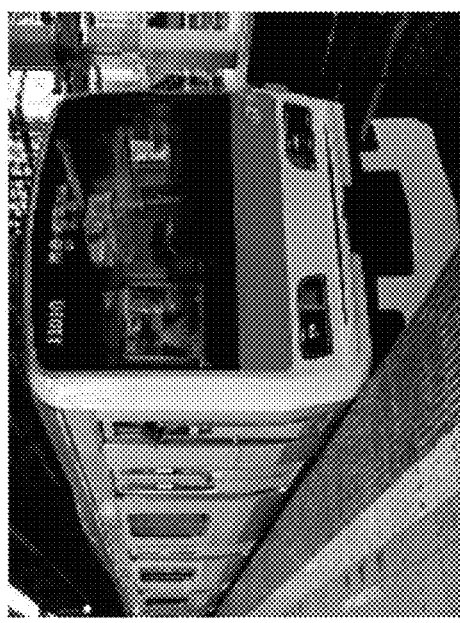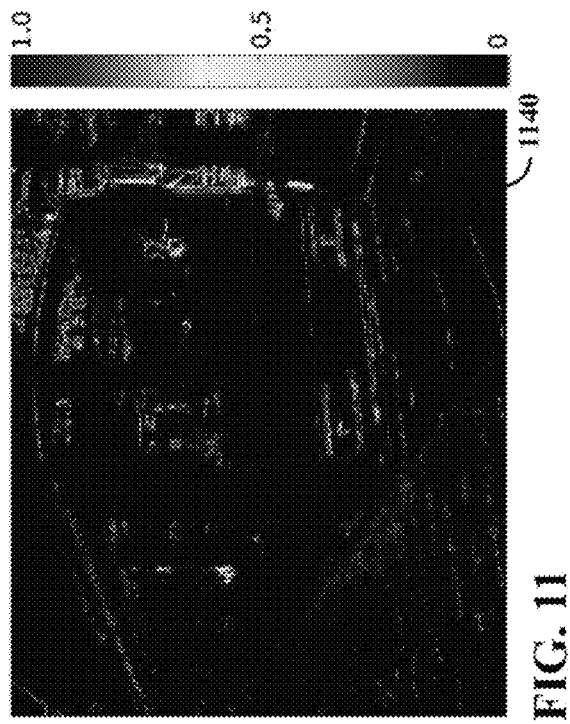
FIG. 11

METHODS AND SYSTEMS FOR CODED ROLLING SHUTTER

CROSS REFERENCE TO RELATED APPLICATION

This application is a continuation of U.S. patent application Ser. No. 13/504,905, filed Dec. 7, 2012, which is the United States National Phase Application under 35 U.S.C. §371 of International Application No. PCT/US2010/054424, filed Oct. 28, 2010, which claims the benefit of U.S. Provisional Patent Application No. 61/255,802, filed Oct. 28, 2009. Each of the above-referenced patent applications is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed subject matter relates to methods and systems for coded rolling shutter of an image of a physical object or a scene. More particularly, the disclosed subject matter relates to controlling readout timing and/or exposure for different rows of a pixel array in an image sensor to flexibly sample the three-dimensional space-time volume of scene appearance for various applications.

BACKGROUND

Digital cameras, digital camcorders, and other imaging devices typically include image sensors, such as charge-coupled device (CCD) image sensors or complementary metal-oxide semiconductor (CMOS) image sensors. Between these two types of image sensors, CMOS image sensors are being used more frequently than CCD image sensors in a variety of imaging devices, such as digital still and video cameras, mobile phone cameras, surveillance cameras, web cameras, etc. This growth is based at least in part on the ability of CMOS image sensors to easily integrate electronics, such as programmable signal processing circuits, on-chip, which provides low cost, low power consumption, and high speed readout features that can be critical for many applications.

FIG. 1 shows an illustrative diagram of a CMOS image sensor 100. As shown, image sensor 100 includes a 4×4 pixel array 105 having rows of pixels with four pixels in each row and an address generator 110. CMOS image sensor 100 includes column-parallel readout circuits that read all of the pixels in a particular row into a line memory and process the data in parallel. Using CMOS image sensor 100, rows of pixels are sequentially exposed to light and the rows of pixels in pixel array 105 are readout row-by-row from the top row of pixel array 105 to the bottom row.

More particularly, as shown in FIGS. 1 and 2, address generator 110 is a shift register that sequentially scans all of the rows and generates row-reset (RST) and row-select (SEL) signals for a row address decoder 115. The exposure for each row of pixels is controlled by the row-reset and row-select signals sent from the address row decoder (e.g., RST_1 and SEL_1 for the first row of pixels in pixel array 105). Each row of pixels becomes photosensitive upon receiving a row-reset signal, and stops collecting photons and starts reading out data upon receiving a row-select signal. Because there is only one row of readout circuits, the readout timings for different rows cannot overlap. This is further illustrated in FIG. 3, which shows an illustrative representation that provides time on the x-axis and rows on the y-axis. As shown, note that the exposure time 310 ($\Delta t_e$) is fixed for each row and the readout times 320 ($\Delta t_r$) are linearly shifted from the top row of the pixel array to the bottom row of the pixel array. This approach, where the image is captured contemporaneously for the pixels in a particular row and not contemporaneously between adjacent rows, is commonly referred to as "rolling shutter."

Rolling shutter and, in particular, the row-wise exposure discrepancy in rolling shutter are considered to be detrimental to image quality. Rolling shutter exposes pixels in different rows to light at different times. This often causes skew, geometric distortions, and other artifacts in an image of a physical object or a scene. The effects of rolling shutter are particularly noticeable in images of moving objects, which is shown in FIG. 4. A vertical line 410 has been included to illustrate the skew or distortion in the image of the moving train caused by rolling shutter.

Various approaches, such as global shutter, attempt to address the limitations of rolling shutter. Imaging devices that implement global shutter expose each pixel in every row of an image sensor to light at the same time to simultaneously capture an image. In global shutter, the readout times and the exposure length for each pixel is the same. However, despite these advances, global shutter and other shutter approaches remain one-dimensional functions. None of these approaches extend beyond one dimension—i.e., the time dimension.

There is therefore a need in the art for approaches that exploit rolling shutter advantageously for computational photography and other applications. There is also a need in the art for approaches that extend the shutter mechanisms to a two-dimensional sampling of the three-dimensional space-time volume of a scene.

Accordingly, it is desirable to provide methods and systems for coded readout of an image that overcome these and other deficiencies of the prior art.

SUMMARY

Methods and systems for coded rolling shutter are provided.

In some embodiments, mechanisms are provided that control the readout timing and exposure length for each row of a pixel array in an image sensor, thereby flexibly sampling the three-dimensional space-time value of a scene and capturing sub-images that effectively encode motion and dynamic range information within a single captured image. Instead of sending out the row-reset and row-select signals sequentially, signals can be sent using a coded pattern. This is sometimes referred to herein as "coded rolling shutter" or "coded shutter."

In some embodiments, the readout timing can be controlled by providing an interlaced readout pattern, such as the interlaced readout pattern shown in FIG. 7, in which the total readout time for one frame is uniformly divided into multiple sub-images (K). Alternatively, the readout timing can be controlled by providing a staggered readout pattern, such as the staggered readout pattern shown in FIGS. 12A and 12B, in which the total readout time for one frame is uniformly divided into multiple sub-images (K) and where the order of readout within K neighboring rows is reversed.

In some embodiments, additionally or alternatively to controlling the readout timing, mechanisms are provided for controlling the exposure length. As described herein, an optimal exposure for each row of a pixel array can be determined. An illustrative coded exposure pattern, where an optimal exposure has been determined for each row of a pixel array, is shown in FIG. 14.

Upon exposing each of the plurality of rows in an image sensor using a coded pattern (e.g., an interlaced readout pattern, a staggered readout pattern, a coded exposure pattern, and/or any suitable combination thereof), a single image is captured that encodes motion and/or dynamic range. From this image, multiple sub-images can be read out or extracted from different subsets of the rows of the pixel array. The multiple sub-images and/or other information encoded in the single captured image can be used to determine optical flow, generate a skew-free image, generate a slow motion video, generate a high dynamic range (HDR) image, etc.

These coded rolling shutter mechanisms can be implemented in an image sensor (such as the image sensor shown in FIG. 1) by modifying the logic of a control unit, such as address generator 110 and without any further hardware modification. More particularly, the logic of address generator can be implemented such that it generates particular row-reset and row-select patterns for coded readout and exposure. Alternatively, an external field-programmable gate array (FPGA) can be used to modify the image sensor.

It should be noted that these mechanisms can be used in a variety of applications, such as skew compensation, recovering slow motion in images of moving objects, high-speed photography, and high dynamic range (HDR) imaging. For example, these mechanisms can be used to improve sampling over the time dimension for high-speed photography. In another example, the coded rolling shutter mechanisms can be used to estimate optical flow, which can be useful for recovering slow motion in an image of a moving object, generating a skew-free image, or removing motion blur in an image due to camera shake. In yet another example, these mechanisms can be used to control readout timing and exposure length to capture high dynamic range images from a single captured image. In a further example, these mechanisms can be used to control readout timing and exposure length to recover a skew-free video from a single captured image.

In accordance with various embodiments, a method for reading an image of a scene detected in an image sensor comprising a pixel array having a plurality of rows of pixels is provided, the method comprising: exposing each of the plurality of rows of the pixel array to the image of the scene; reading-out a first subset of the rows of the pixel array to extract a first sub-image from the image; and reading-out a second subset of the rows of the pixel array to extract a second sub-image from the image, wherein the first subset of the rows of the pixel array is different from the second subset of the rows of the pixel array.

It should be noted that, in some embodiments, the first subset of the rows of the pixel array and the second subset of the rows of the pixel array are uniformly distributed between the plurality of rows of the pixel array.

In some embodiments, optical flow between the first sub-image and the second sub-image can be estimated for at least one of recovering slow motion, substantially removing skew from the image, and substantially removing motion blur from the image. For example, an intermediate image that is interpolated between the first sub-image and the second sub-image can be determined based at least in part on the estimated optical flow, wherein skew is substantially removed in the intermediate image. In another example, the first sub-image, the intermediate image, and the second sub-image can be combined to create a slow motion interpolated video. In yet another example, where the estimated optical flow corresponds to motion information associated with the image sensor, a point spread function for the image can be estimated based at least in part on the motion information and applied to enhance an output image generated from at least one of the first sub-image and the second sub-image, thereby substantially removing motion blur the output image.

In accordance with various embodiments, a method for reading an image of a scene detected in an image sensor comprising a pixel array having a plurality of rows of pixels, where the plurality of rows includes a given row, a higher row that is higher in the pixel array than the given row, and a lower row that is lower in the pixel array than the given row, is provided, the method comprising: receiving a coded pattern for controlling readout times in the pixel array and for extracting a plurality of sub-images from the image; exposing each of the plurality of rows of the pixel array to the image of the scene; reading-out the given row of the plurality of rows, wherein the given row is selected for readout based on the number of sub-images; reading-out a first set of higher rows subsequent to reading-out the given row; reading-out the lower row subsequent to reading-out the first set of higher rows, wherein the lower row is selected for readout based on the number of sub-images; and reading-out a second set of higher rows subsequent to reading-out the lower row.

In accordance with various embodiments, a method for reading an image of a scene detected in an image sensor comprising a pixel array having a plurality of rows of pixels is provided, the method comprising: controlling a first exposure time for a first row of the plurality of rows and a second exposure time for a second row of the plurality of rows, wherein the first exposure time is controlled to be different from the second exposure time; and reading-out the first row and the second row.

In some embodiments, an optimal exposure time for at least one of the first exposure time for the first row and the second exposure time for the second row can be determined. For example, a first image of the scene (e.g., using conventional auto-exposure) can be obtained, an optimal exposure time for each of the plurality of rows of the pixel array can be determined based at least in part on scene radiance, and a second image of the scene can be obtained, where a first exposure time for a first row of the plurality of rows of the pixel array and a second exposure time for a second row of the plurality of rows of the pixel array are adjusted based at least in part on the determined optimal exposure time for that row. In addition, in some embodiments, the pixel values of the second image can be normalized with respect to the determined optimal exposure time applied for each of the plurality of rows of the pixel array.

In some embodiments, a plurality of sub-images can be extracted from the image using the controlled readout times and the controlled exposure times, where the plurality of sub-images are uniformly distributed between the plurality of rows in the pixel array.

In some embodiments, the plurality of sub-images extracted from the image can be combined to compose a high dynamic range image.

In some embodiments, two or more of the plurality of sub-images can be used and/or compared to compensate for motion blur. For example, optical flow between a first sub-image and a second sub-image of the plurality of sub-images can be estimated. Motion information (e.g., blur kernels) can be determined based at least in part on the estimated optical flow and the determined motion information can be applied to enhance a high dynamic range image that is composed by combining the plurality of sub-images extracted from the image, thereby substantially removing motion blur from the high dynamic range image.

In some embodiments, the determined motion information is incrementally applied to each of the plurality of sub-images to substantially remove motion blur from each of the plurality of sub-images prior to combining the plurality of sub-images to compose a high dynamic range image.

In accordance with various embodiments, a method for reading an image of a scene detected in an image sensor comprising a pixel array having a plurality of rows of pixels is provided, the method comprising: receiving a coded pattern that controls a plurality of exposure times and a plurality of readout times and wherein each of the plurality of exposure times and each of the plurality of readout times are associated with one of the plurality of rows of the pixel array; exposing each of the plurality of rows of the pixel array to the image of the scene in accordance with the received coded pattern; reading-out the plurality of rows of the pixel array in accordance with the received coded pattern to obtain a pixel value for each pixel; reconstructing estimated pixel values for each pixel over time based on pixel values from neighboring rows in the pixel array; and constructing a video using the reconstructed estimated pixel values, wherein skew is substantially reduced in the constructed video.

In some embodiments, the coded pattern randomly assigns the plurality of exposure times and the plurality of readout times for the plurality of rows of the pixel array.

In accordance with various embodiments, a system for reading an image of a scene is provided, the system comprising: an image sensor comprising a pixel array having a plurality of rows; and at least one controller that: exposes each of the plurality of rows of the pixel array to the image of the scene; reads-out a first subset of the rows of the pixel array to extract a first sub-image from the image; and reads-out a second subset of the rows of the pixel array to extract a second sub-image from the image, wherein the first subset of the rows of the pixel array is different from the second subset of the rows of the pixel array.

In accordance with various embodiments, a system for reading an image of a scene is provided, the system comprising: an image sensor comprising a pixel array having a plurality of rows of pixels, wherein the plurality of rows includes a given row, a higher row that is higher in the pixel array than the given row, and a lower row that is lower in the pixel array than the given row; and at least one controller that: receives a coded pattern for controlling readout times in the pixel array and for extracting a plurality of sub-images from the image; exposes each of the plurality of rows of the pixel array to the image of the scene; reads-out the given row of the plurality of rows, wherein the given row is selected for readout based on the number of sub-images; reads-out a first set of higher rows subsequent to reading-out the given row; reads-out the lower row subsequent to reading-out the first set of higher rows, wherein the lower row is selected for readout based on the number of sub-images; and reads-out a second set of higher rows subsequent to reading-out the lower row.

In accordance with various embodiments, a system for reading an image of a scene is provided, the system comprising: an image sensor comprising a pixel array having a plurality of rows; and at least one controller that: controls a first exposure time for a first row of the plurality of rows and a second exposure time for a second row of the plurality of rows, wherein the first exposure time is controlled to be different from the second exposure time; and reads-out the first row and the second row.

In accordance with various embodiments, a system for reading an image of a scene is provided, the system comprising: an image sensor comprising a pixel array having a plurality of rows; and at least one controller that: receives a coded pattern that controls a plurality of exposure times and a plurality of readout times and wherein each of the plurality of exposure times and each of the plurality of readout times are associated with one of the plurality of rows of the pixel array; exposes each of the plurality of rows of the pixel array to the image of the scene in accordance with the received coded pattern; reads-out the plurality of rows of the pixel array in accordance with the received coded pattern to obtain a pixel value for each pixel; reconstructs estimated pixel values for each pixel over time based on pixel values from neighboring rows in the pixel array; and constructs a video using the reconstructed estimated pixel values, wherein skew is substantially reduced in the constructed video.

BRIEF DESCRIPTION OF THE DRAWINGS

FIG. 1 illustrates a schematic diagram of a CMOS image sensor.

FIG. 2 illustrates a schematic diagram of a particular pixel in the pixel array of the CMOS image sensor of FIG. 1.

FIG. 11 illustrates an example of a skew-free image interpolated from the obtained sub-images in accordance with some embodiments of the disclosed subject matter.

DETAILED DESCRIPTION

In accordance with various embodiments, mechanisms for coded shutter are provided. In some embodiments, mechanisms are provided that control the readout timing and exposure length for each row of a pixel array in an image sensor, thereby flexibly sampling the three-dimensional space-time value of a scene and capturing sub-images that effectively encode motion and dynamic range information within a single captured image. Instead of sending out the row-reset and row-select signals sequentially, signals can be sent using a coded pattern.

Figure 7:
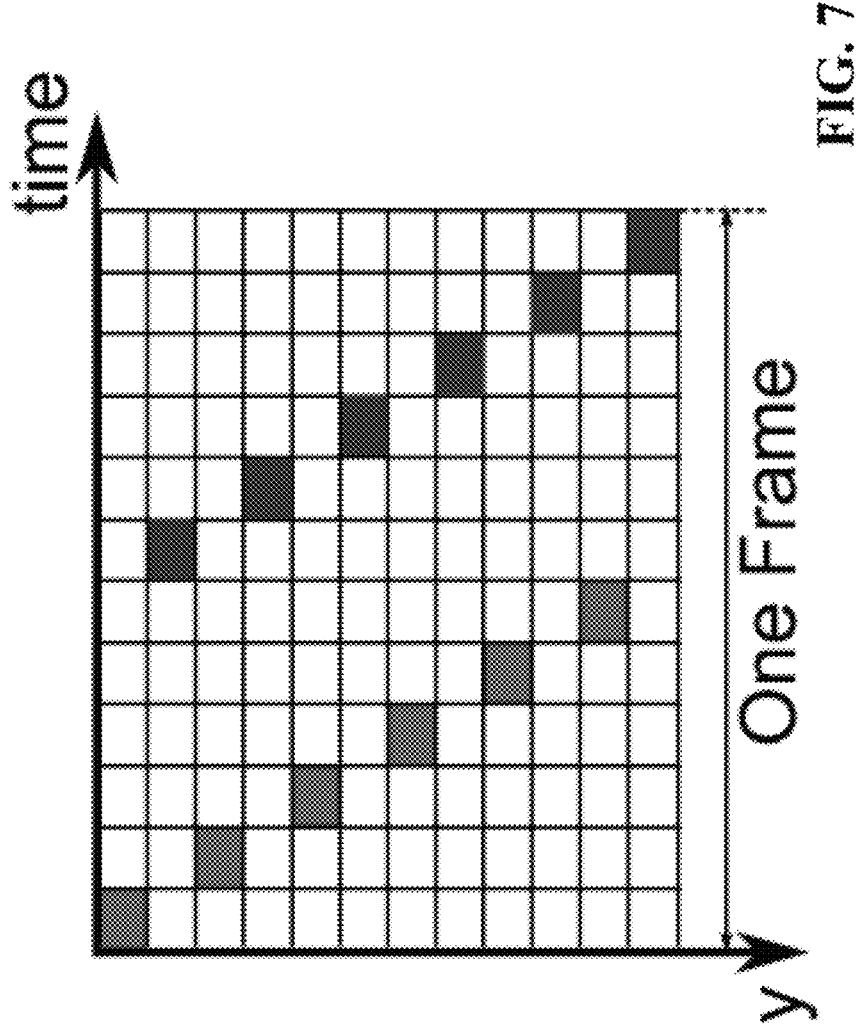
FIG. 7 illustrates a representation of an interlaced readout pattern, where the readout time for one frame can be uniformly distributed into a number of sub-images in accordance with some embodiments of the disclosed subject matter.

In some embodiments, the readout timing can be controlled by providing an interlaced readout pattern, such as the interlaced readout pattern shown in FIG. 7, in which the total readout time for one frame is uniformly divided into multiple sub-images (K). Alternatively, the readout timing can be controlled by providing a staggered readout pattern, such as the staggered readout pattern shown in FIGS. 12A and 12B, in which the total readout time for one frame is uniformly divided into multiple sub-images (K) and where the order of readout within K neighboring rows is reversed.

Figure 14:
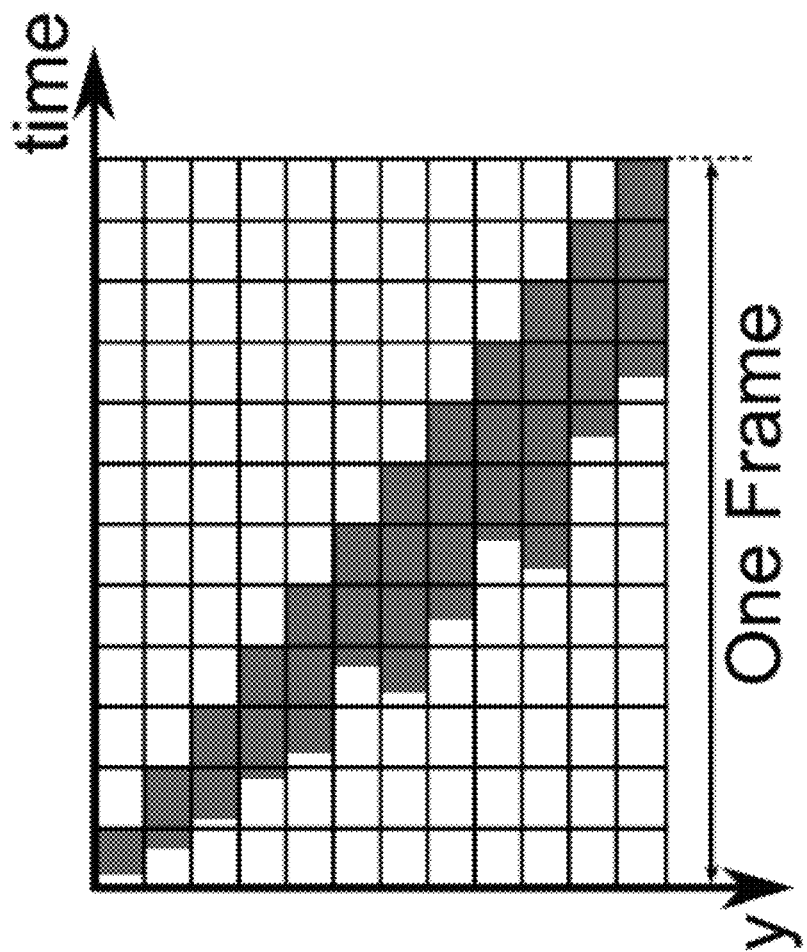
FIG. 14 illustrates a representation of a coded exposure pattern for the different rows of the pixel array in accordance with some embodiments of the disclosed subject matter.

In some embodiments, additionally or alternatively to controlling the readout timing, mechanisms are provided for controlling the exposure length. As described herein, an optimal exposure for each row of a pixel array can be determined. An illustrative coded exposure pattern, where an optimal exposure has been determined for each row of a pixel array, is shown in FIG. 14.

Upon exposing each of the plurality of rows in an image sensor using a coded pattern (e.g., an interlaced readout pattern, a staggered readout pattern, a coded exposure pattern, and/or any suitable combination thereof), a single image is captured that encodes motion and/or dynamic range. From this image, multiple sub-images can be read out or extracted from different subsets of the rows of the pixel array. The multiple sub-images and/or other information encoded in the single captured image can be used to determine optical flow, generate a skew-free image, generate a slow motion video, generate a high dynamic range (HDR) image, etc.

These coded rolling shutter mechanisms can be implemented in an image sensor (such as the image sensor shown in FIG. 1) by modifying the logic of a control unit, such as address generator 110 and without any further hardware modification. More particularly, the logic of address generator can be implemented such that it generates particular row-reset and row-select patterns for coded readout and exposure. Alternatively, an external field-programmable gate array (FPGA) can be used to modify the image sensor.

It should be noted that these mechanisms can be used in a variety of applications, such as skew compensation, recovering slow motion in images of moving objects, high-speed photography, and high dynamic range (HDR) imaging. For example, these mechanisms can be used to improve sampling over the time dimension for high-speed photography. In another example, the coded rolling shutter mechanisms can be used to estimate optical flow, which can be useful for recovering slow motion in an image of a moving object, generating a skew-free image, or removing motion blur in an image due to camera shake. In yet another example, these mechanisms can be used to control readout timing and exposure length to capture high dynamic range images from a single captured image. In a further example, these mechanisms can be used to control readout timing and exposure length to recover a skew-free video from a single captured image.

Figure 3:
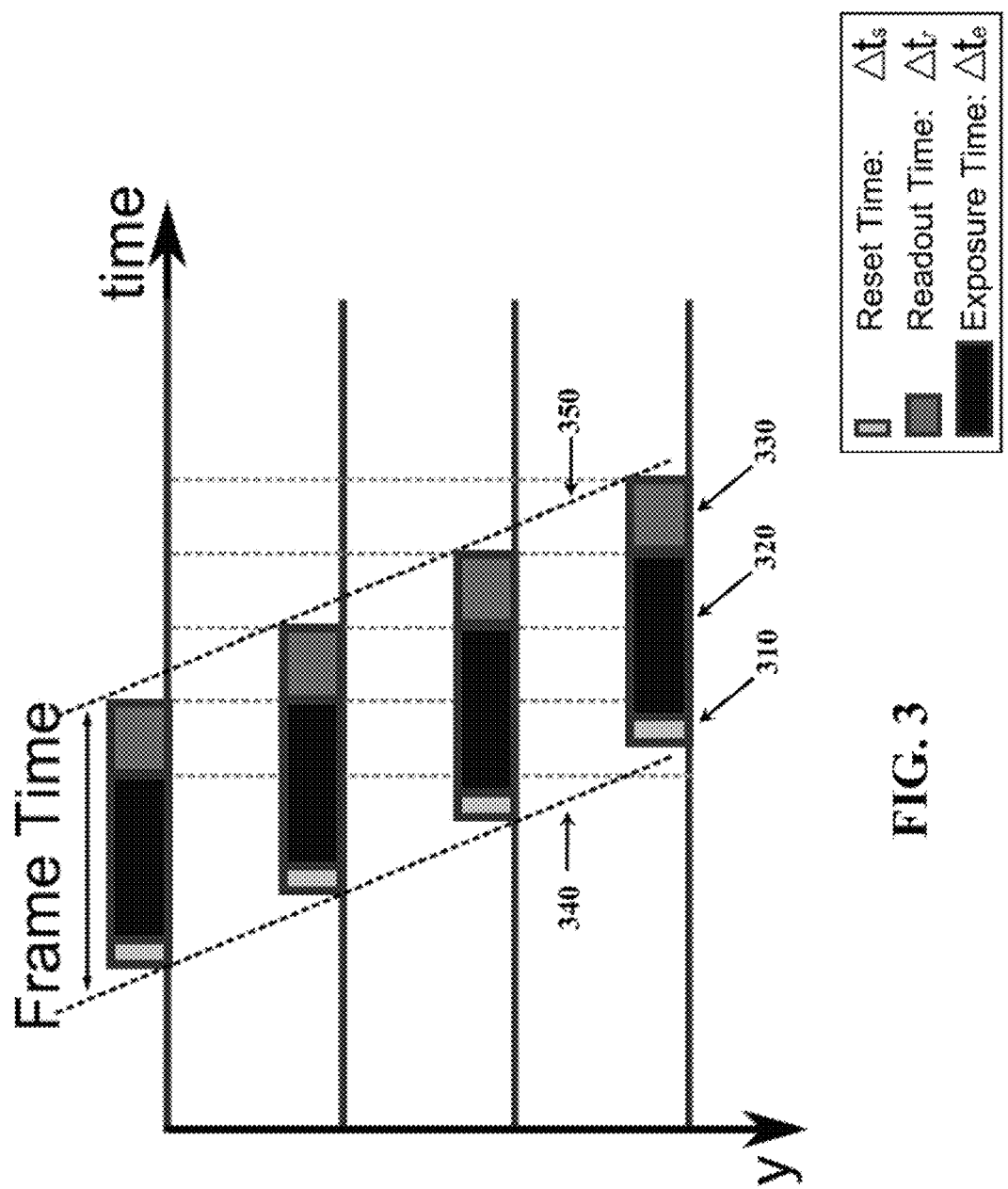
FIG. 3 illustrates a representation of conventional rolling shutter, where the exposure time is fixed for each row and the readout times are linearly shifted from the top row of the pixel array to the bottom row of the pixel array.

Referring back to FIG. 3, for conventional rolling shutter, it should be noted that reset time, readout time, and exposure time can be represented by $\Delta t$ (area 310), $\Delta t_r$ (area 320), $\Delta t_e$ (area 330), respectively. For an image sensor with M-number of rows, the reset timing for the y-th row, where y is between 1 and M rows, can be represented by the function $t_s(y)$, and the readout timing can be represented by the function $t_r(y)$. For conventional rolling shutter shown in FIG. 3, the reset time, readout time, and exposure time are the same for each row in the image sensor, but are linearly shifted. The reset timing function $t_s(y)$ is shown by the rising edge of the row-reset signals or line 340. Similarly, the readout timing function $t_r(y)$ is shown by the falling edge of the row-readout signals or line 350. Accordingly, for conventional rolling shutter, $t_r(y)=y\Delta t_r$ and $t_s(y)=t_r(y)-\Delta t_e-\Delta t_r-\Delta t_s$.

Figure 5:
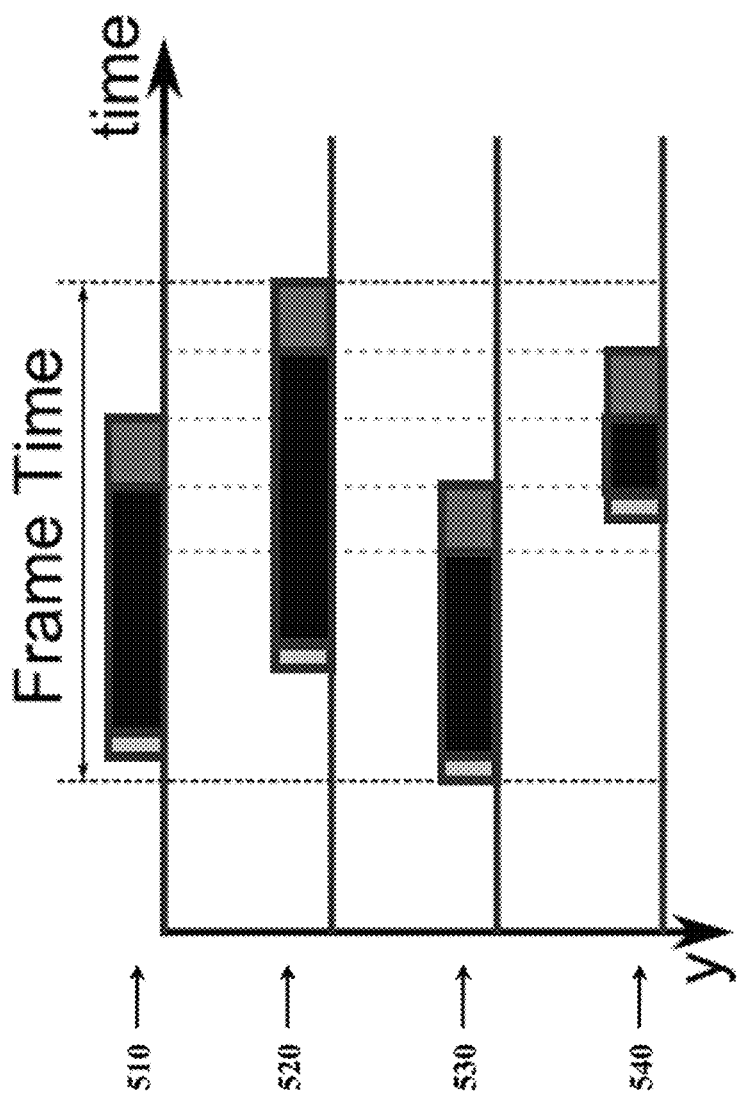
FIG. 5 illustrates a representation of a coded rolling shutter mechanism, where readout timing and exposure length can be controlled in accordance with some embodiments of the disclosed subject matter.

In accordance with some embodiments of the disclosed subject matter, the reset timing, $t_s(y)$, and the readout timing, $t_r(y)$, can be controlled by the address generator. Accordingly, the address generator can also control the exposure time, $\Delta t_e$. For example, FIG. 5 shows an illustrative representation of using the address generator to control the readout timing and exposure length for different rows of an image sensor. As shown in FIG. 5, it should be noted that the readout timing and exposure length for each of rows 510, 520, 530, and 540 can be different.

It should be noted that controlling the readout timing and exposure length for the rows of an image sensor provide greater flexibility for sampling the three-dimensional space-time volume of a scene into a single two-dimensional image. To illustrate this, let $E(x,y,t)$ denote the radiance of a scene point (x,y) at time t, and let $S(x,y,t)$ denote the shutter function of a camera. The captured image, $I(x,y)$, can then be represented as:

$$I(x,y)=\int_{-\infty}^{\infty}E(x,y,t)\cdot S(x,y,t)dt$$

The coded rolling shutter mechanisms described herein extend the shutter function, $S(x,y,t)$, to two dimensions as both readout timing, $t_r(y)$, and the exposure time, $\Delta t_e$, can be row-specific. That is, the shutter function for coded rolling shutter is a function of time and image row index. It should be noted that this is unlike conventional rolling shutter and other shutter mechanisms that are merely one-dimensional functions of time.

Figure 6:
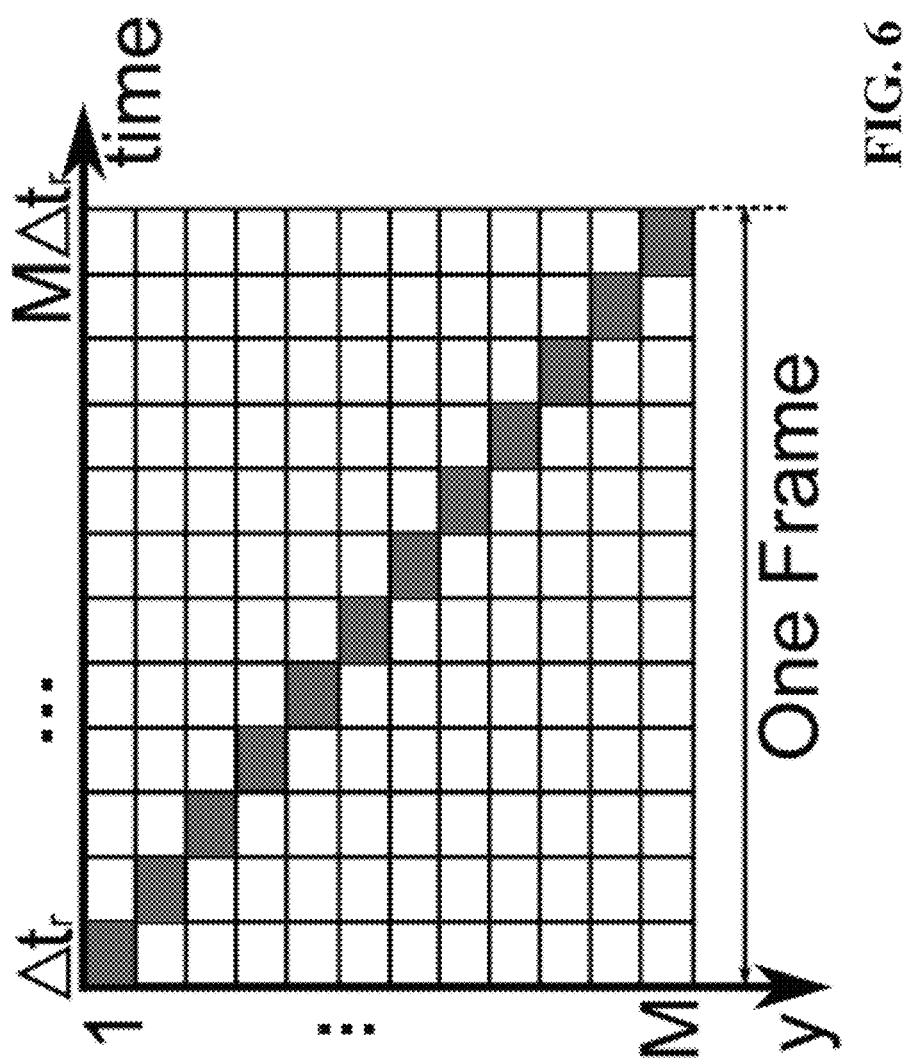
FIG. 6 illustrates a representation of the assignment of conventional rolling shutter.

As mentioned previously, as there is one row of readout circuits, the readout timings for different rows cannot overlap. This imposes a constraint on readout timing, $t_r(y)$. More particularly, for an image sensor with M rows, the total readout time for one frame is $M\Delta t_r$. Each readout timing pattern corresponds to a one-to-one assignment of the M readout timing slots to the M rows. The assignment for conventional rolling shutter is shown in FIG. 6. As shown, the readout times for each row are linearly shifted from the top row of pixels to the bottom row of pixels.

In accordance with some embodiments, these coded rolling shutter mechanisms can be used to better sample the time dimension by controlling (e.g., shuffling) the readout timings, $t_r(y)$, among rows. For example, in some embodiments, an interlaced readout pattern, such as the one shown in FIG. 7, can be used. Alternatively, a staggered readout pattern, such as the one shown in FIGS. 12A and/or 12B, can be used. It should be noted that, as there is one row of readout circuits, the readout timings for different rows in the interlaced readout pattern shown in FIG. 7 and the staggered readout pattern shown in FIGS. 12A and 12B do not overlap.

Figure 9:
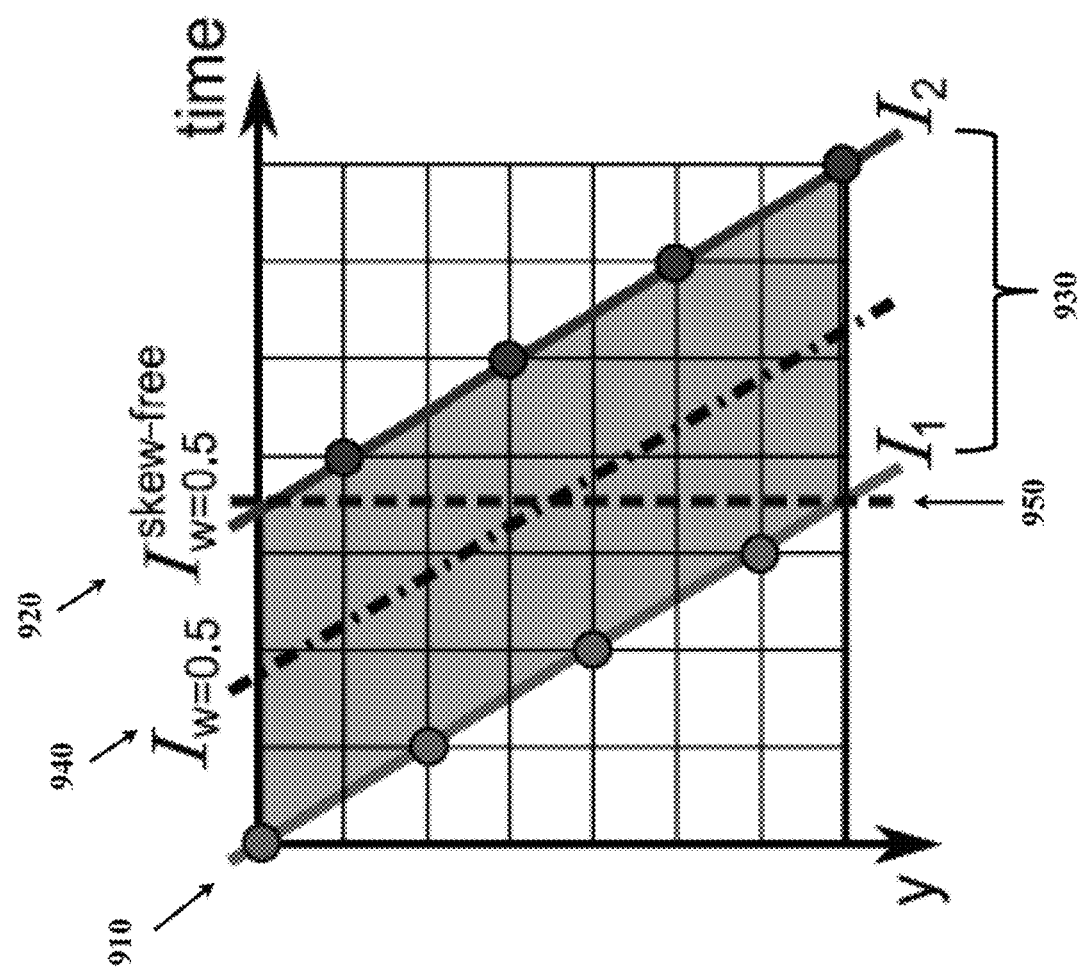
FIG. 9 illustrates a representation of interpolating intermediate images and determining a skew-free image from the obtained sub-images in accordance with some embodiments of the disclosed subject matter.

FIG. 7 is an illustrative example of an interlaced readout pattern in accordance with some embodiments of the disclosed subject matter. In the interlaced readout pattern, the total readout time for one frame can be uniformly distributed into K sub-images. Each sub-image, which is encoded in a single captured image, has M/K rows while preserving full resolution in the horizontal direction. As shown in the interlaced readout pattern of FIG. 7, the total readout time is uniformly distributed into two sub-images (K=2) and each sub-image includes six rows of the pixel array. This is also shown in FIG. 9, where two sub-images $I_1$ and $I_2$ (represented by lines 910 and 920, respectively) are read out from a single captured image using the interlaced readout pattern. More particularly, each sub-image is associated with a subset of rows of the pixel array (e.g., a first sub-image with a first set of rows, a second sub-image with a second subset of rows, etc.).

It should be noted that, although FIG. 7 and other figures herein shows that two sub-images $I_1$ and $I_2$ are read out from a single captured image using the interlaced readout pattern, any suitable number of K sub-images can be read out from the captured image.

For the interlaced readout pattern, the readout timing, $t_r(y)$ for the y-th row can be represented as follows:

$$t_r(y)=\left(\frac{M(y-1)}{K}-\left\lfloor\frac{y-1}{K}\right\rfloor\cdot(M-1)+1\right)\Delta t_r,$$

where the image sensor has a total of M rows and where $\lfloor\cdot\rfloor$ is the floor function.

In some embodiments, the interlaced readout pattern can be used for skew compensation and high speed photography. More particularly, an address generator, such as address generator 110 of FIG. 1, can send the interlaced readout pattern to a pixel array to capture a single image, where the frame rate is substantially increased and the skew is substantially reduced in the sub-images obtained from the single captured image.

Regarding skew in the sub-images, it should be noted that the time lag between the top row and the bottom row of each sub-image is $M\Delta t_r/K$, where M is the total number of rows in the image sensor, $\Delta t_r$ is the readout time, and K is the number of sub-images. As described above, for conventional rolling shutter, the time lag between the top row and the bottom row for one frame is $M\Delta t_r$. Thus, the skew in these sub-images is 1/K time of the skew in conventional rolling shutter. Accordingly, the skew in the K sub-images is substantially reduced from the skew of an image captured using conventional rolling shutter.

In addition, it should be noted that the time lag between two consecutive sub-images is also reduced to $M\Delta t_r/K$. Thus, the frame rate increases K times between the obtained sub-images. Accordingly, the frame rate in the K sub-images is substantially increased from the frame rate of an image captured using conventional rolling shutter.

Figure 4:
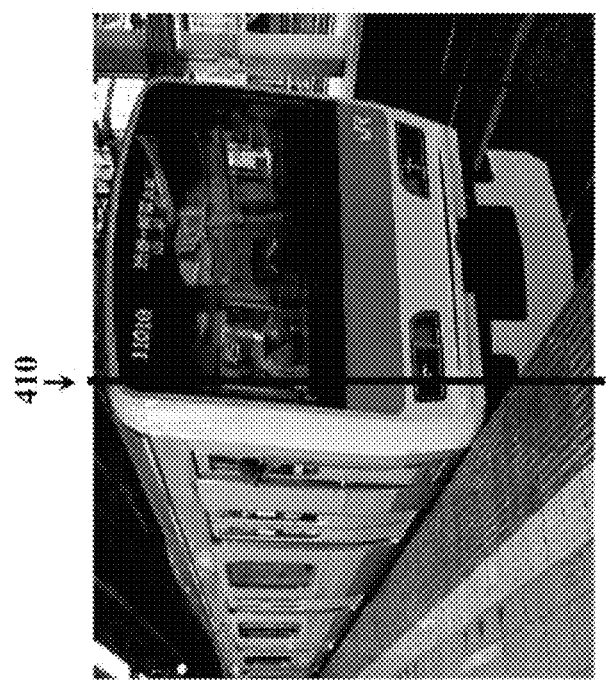
FIG. 4 illustrates an example of an image generated from an image sensor implementing the convention rolling shutter mechanism shown in FIG. 3.
Figure 8:
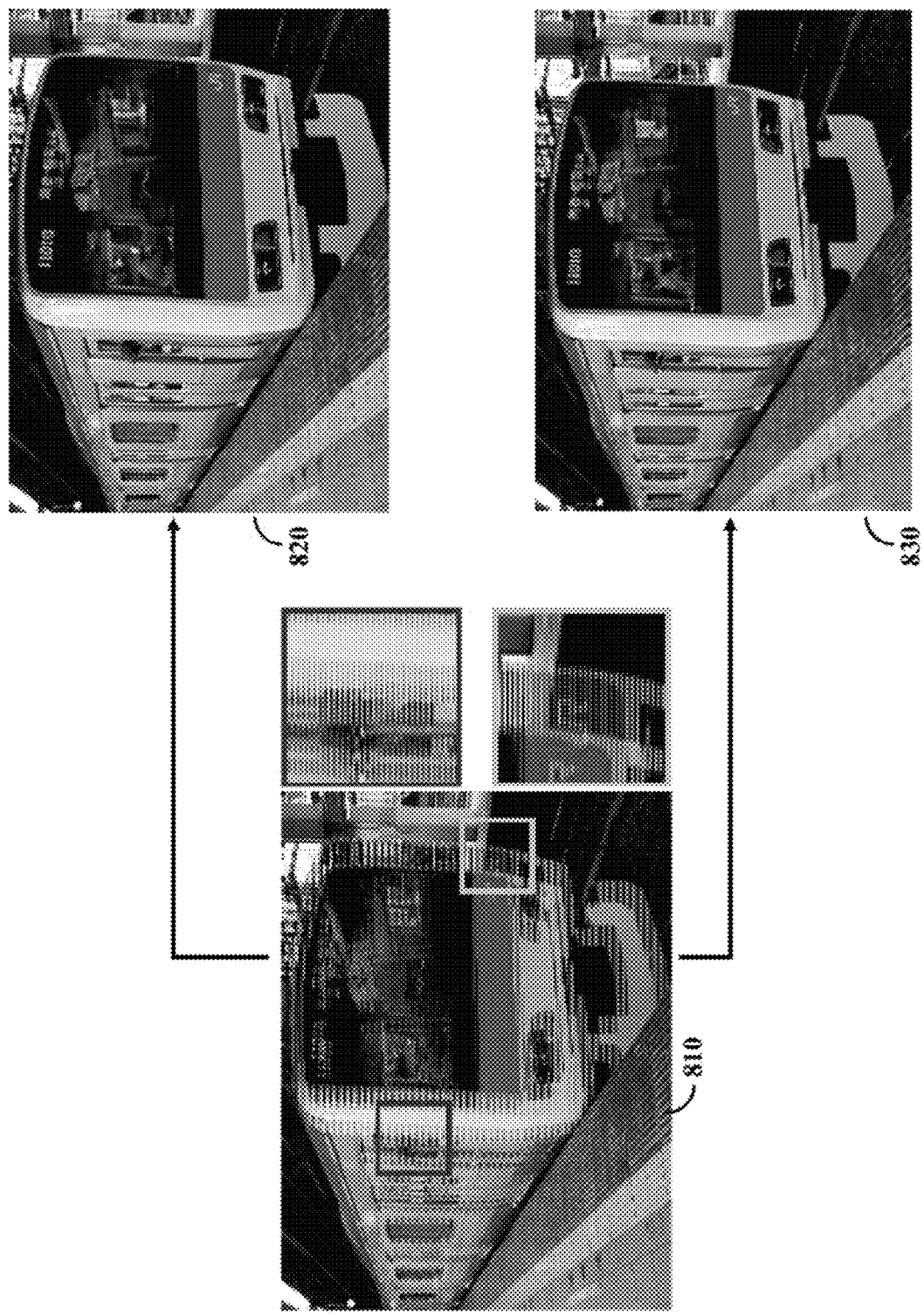
FIG. 8 illustrates examples of an input image and two sub-images obtained using the interlaced readout pattern of FIG. 7 in accordance with some embodiments of the disclosed subject matter.

Illustrative examples of the sub-images obtained using the interlaced readout pattern of FIG. 7 are shown in FIG. 8. As shown, sub-images 820 and 830 are read out or extracted from a single captured image 810 that was obtained from an image sensor using the interlaced readout pattern. It should be noted that the skew in sub-images 820 and 830 is substantially reduced in comparison with the image shown in FIG. 4 that uses conventional rolling shutter.

It should also be noted that cubic interpolation or any other suitable approach can be used to resize sub-images 820 and 830 vertically to full resolution. For example, for a captured input image with a resolution of 640×480 (M=480 and K=2), each sub-image read out from the captured input image has a resolution of 640×240. Note that, using the interlaced readout pattern, full resolution in the horizontal direction is preserved. Each sub-image can be resized to 640×480 or full resolution by interpolation. The interpolated images are represented by solid lines 910 and 920 (FIG. 9) for sub-images $I_1$ and $I_2$, respectively, where the circles represent the sampled points from the input coded image (e.g., image 810 of FIG. 8).

Figure 10:
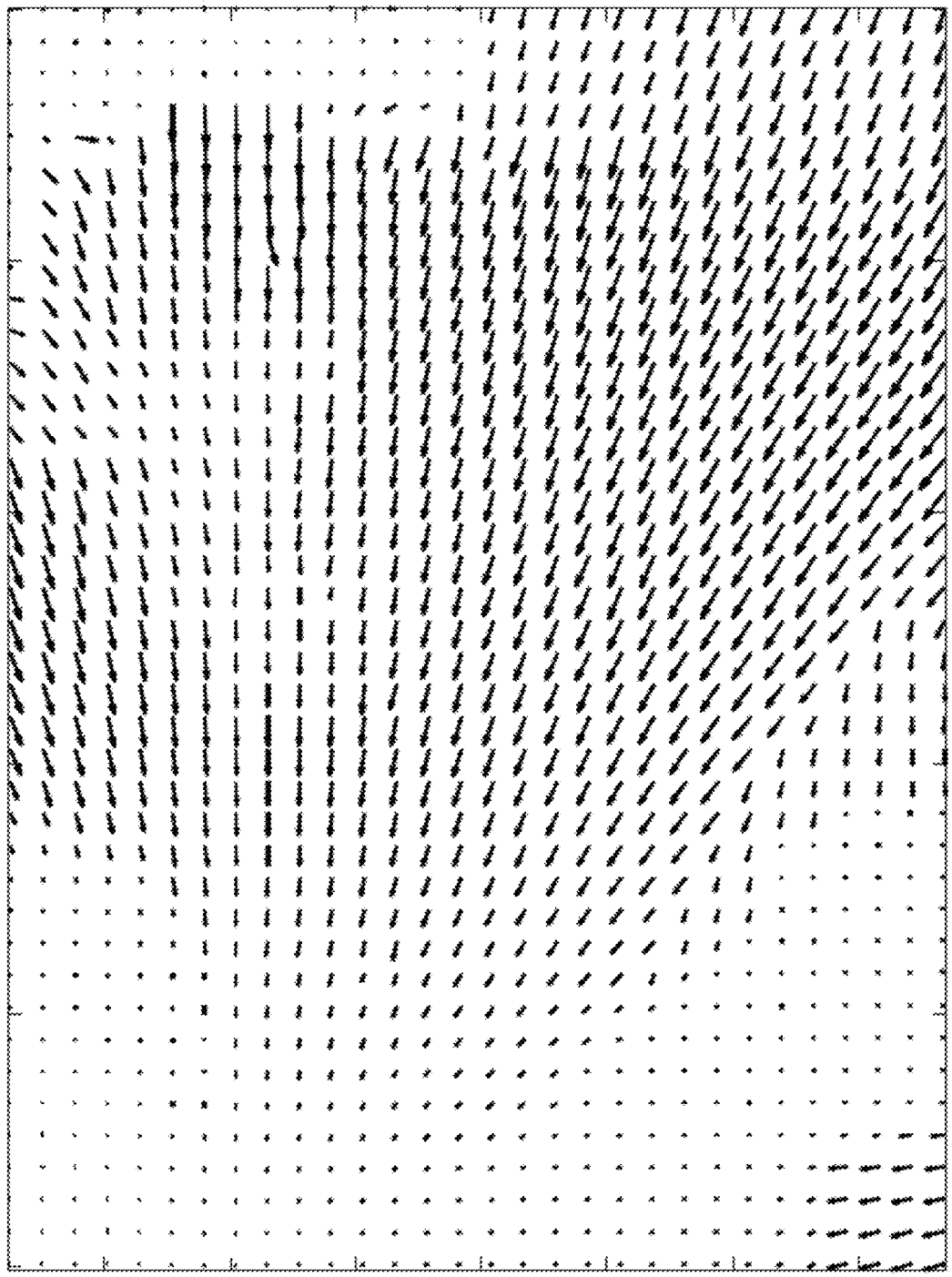
FIG. 10 illustrates an example of the determined optical flow between the two sub-images in accordance with some embodiments of the disclosed subject matter.

In some embodiments, the extracted sub-images can be used to estimate optical flow. As described above, cubic interpolation or any other suitable interpolation approach can be used to resize the two sub-images $I_1$ and $I_2$ vertically to full resolution (shown as solid lines 910 and 920 in FIG. 9). The optical flow $u_0$ can be determined between the two sub-images. For example, the optical flow can be determined based on the motion of the brightness patterns between the two sub-images. In another example, flow vectors can be determined by comparing the position of particular points in the two sub-images. FIG. 10 illustrates an example of the determined optical flow between the two sub-images. Estimated optical flow can be used, for example, to recover slow motion, remove skew from an image, and/or remove motion blur caused by camera shake from an image.

Using the determined optical flow, intermediate images within a shaded area 930 and between the interpolated sub-images ($I_1$ and $I_2$) can be determined using bidirectional interpolation. For example, in some embodiments, intermediate images can be determined using the following equation:

$$I_w(p)=(1-w)I_1(p-wu_w(p))+wI_2(p+(1-w)u_w(p)),$$

where $0 \le w \le 1$, $p=(x,y)$ represents one pixel, and $u_w(p)$ is the forward-warped optical flow computed as $u_w(p+wu_0(p))=u_0(p)$. For example, as shown in FIG. 9, line 940 shows the intermediate image $I_{w=0.5}$ that can be recovered using bidirectional interpolation of the two sub-images. An example of an interpolated intermediate image 1110 calculated based at least in part on the estimated optical flow is shown in FIG. 11.

In some embodiments, a skew-free image can be interpolated from the obtained sub-images. As shown in FIG. 9, line 950 shows the interpolated skew-free image, $I_{w=0.5}^{skew-free}$. This can be done by replacing the scalar w shown in the above-mentioned equation with a vector, such as $w=1-(y-1)/(M-1)$. An example of a skew-free image 1120 generated from input image 810 of FIG. 8 is also shown in FIG. 11. It should be noted that skew-free image 1120 has substantially compensated for the skew shown in FIG. 4.

To illustrate the skew compensation feature of the disclosed subject matter, FIG. 11 also includes images 1130 and 1140 that illustrates the differences between a ground truth image and interpolated images 1110 and 1120 obtained using the interlaced readout pattern. In particular, images 1130 and 1140 illustrate the error calculated between interpolated images 1110 and 1120 and the ground truth image, where the brighter portions of image 1130 and 1140 identify the areas with greater error or difference from the ground truth image. Note that the skew in image 1110 ($I_{w=0.5}$) is substantially reduced from the skew shown in FIG. 4 and that image 1120 is nearly skew-free. The small error in skew-free image 1120 can be caused, for example, by occlusions during the estimation of optical flow.

In addition to compensating for skew, in some embodiments, the sub-images read out from the single captured image using the interlaced readout pattern of FIG. 7 or any other suitable interlaced readout pattern and/or one or more interpolated images can be combined to create a slow motion interpolated video from information encoded in a single captured image. That is, for high speed photography, two or more sub-images can be resized to full resolution and arranged to create a slow-motion video (e.g., interpolated images of a person running, resized sub-images of a balloon popping, etc.). For example, upon capturing a single image having a resolution of 1280×1000 and using an interlaced readout pattern with eight sub-images (K=8), the output video can include eight sub-images that each have a resolution of 1280×125. In another example, the eight sub-images can be resized vertically to full resolution and arranged to generate the output video.

It should be noted that motion blur due to camera shake is a common problem in photography. Merely pressing a shutter release button on a camera can in and of itself cause the camera to shake, and unfortunately result in blurred images. The compact form and small lenses of many of these digital cameras only services to increase the camera shake problem.

In some embodiments, the sub-images and the estimated optical flow from the sub-images can be used to remove motion blur from a single image caused by camera shake or any other suitable motion (sometimes referred to herein as "motion de-blurring"). As described above, cubic interpolation or any other suitable interpolation approach can be used to resize the two sub-images $I_1$ and $I_2$ vertically to full resolution (see, e.g., FIG. 8). The optical flow $u_0$ can then be determined or estimated between the two sub-images (see, e.g., FIG. 10), where the optical flow can encode motion information between the sub-images. Using the estimated optical flow, a blur estimation, such as a point spread function (PSF), can be calculated. For example, a point spread function (PSF) can be calculated that represents the spatial motion and/or the speed of the moving camera. Accordingly, an output image can be enhanced and/or substantially de-blurred by applying the calculated point spread function to the output image (e.g., an interpolated sub-image, a combination of the interpolated sub-images, etc.).

Figure 12A:
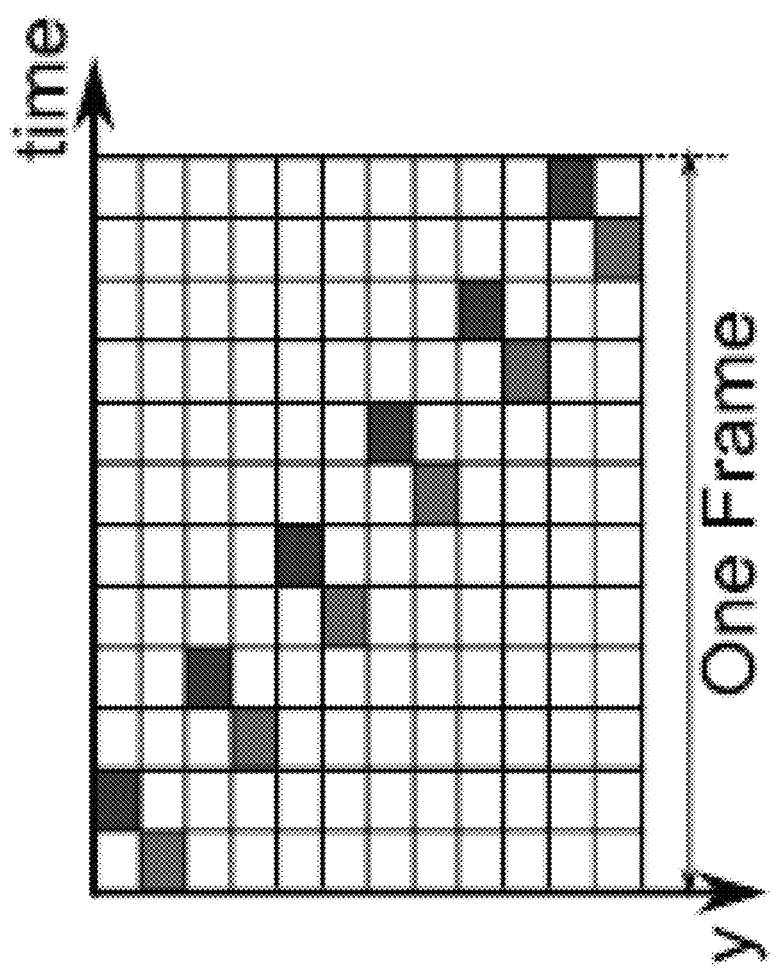
FIGS. 12A and 12B illustrate representations of a staggered readout pattern, where the readout time for one frame can be uniformly distributed into a number of sub-images and where the order of readout is reversed in accordance with some embodiments of the disclosed subject matter.

Alternatively, in accordance with some embodiments, the readout timing of the image sensor can be controlled by implementing a staggered readout pattern, such as the staggered readout pattern shown in FIGS. 12A and/or 12B. As shown in the staggered readout patterns of FIGS. 12A and 12B, the total readout time for one frame is uniformly divided into multiple sub-images (K). As also shown, the staggered readout pattern reverses the order of readout with every K neighboring rows. Similar to the interlaced readout pattern described above, K sub-images can be extracted from a single coded image, where each sub-image has M/K rows.

Figure 12B:
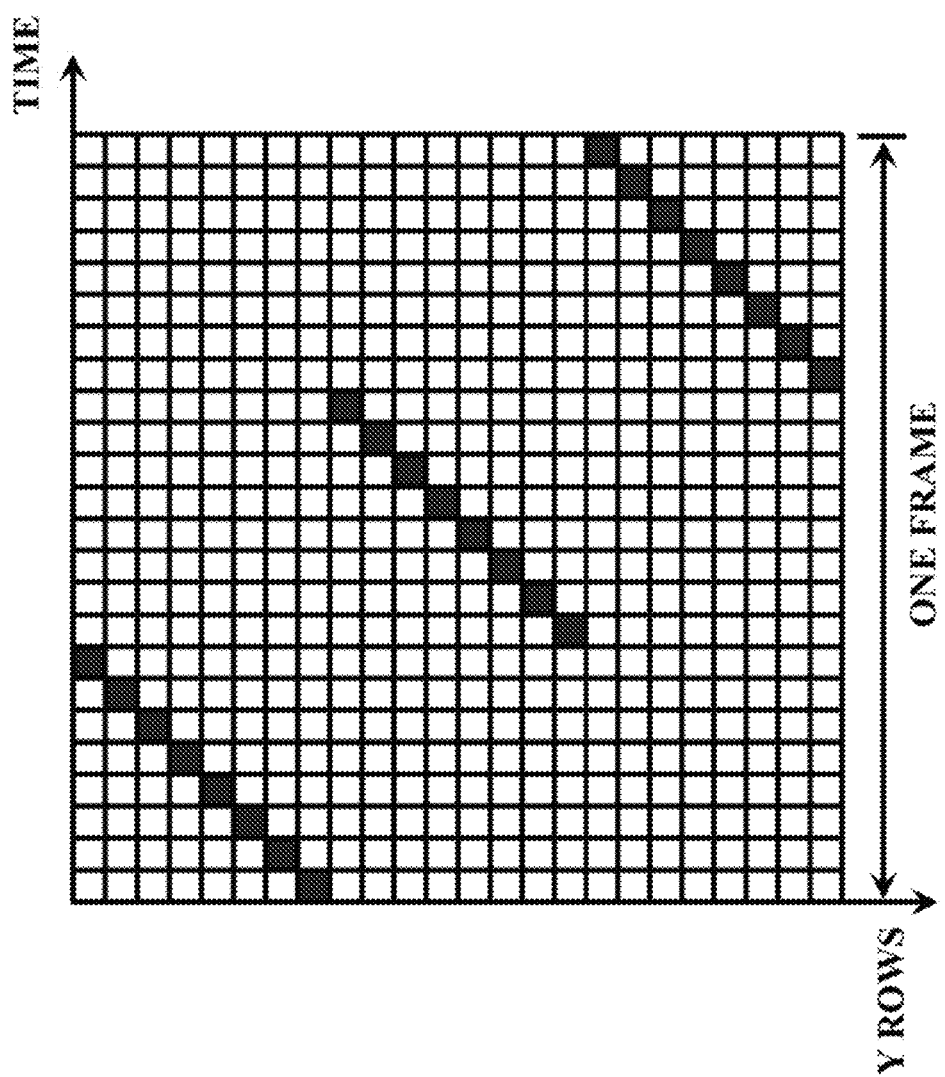

In a more particular example, FIG. 12A shows that two sub-images (K=2) are extracted from a single captured image and that the two sub-images are uniformly distributed between the twelve rows of the pixel array. Similarly, FIG. 12B shows that eight sub-images are extracted from a single captured image. It should be noted that the eight sub-images are uniformly distributed between the rows of the pixel array. However, any suitable number of K sub-images can be read out from the captured image using the staggered readout pattern.

For the staggered readout pattern, the readout timing, $t_r(y)$, for the y-th row can be represented as follows:

$$t_r(y) = \left(\left(2\left\lfloor\frac{y-1}{K}\right\rfloor+1\right)K-y+1\right)\Delta t_r.$$

It should be noted that the time lag within each sub-image for staggered readout is $(M-K+1)\Delta t_r$.

It should also be noted that the time lag between two consecutive sub-images is $\Delta t_r$, which is a substantially higher frame rate than the frame rate achieved using conventional rolling shutter. The readout time, $\Delta t_r$, is generally between about $15 \times 10^{-6}$ seconds or 15 microseconds and about $40 \times 10^{-6}$ or 40 microseconds. Accordingly, an image sensor that uses staggered readout can be used for ultra-high speed photography of time-critical events, such as a speeding bullet, a bursting balloon, a foot touching the ground, etc.

Figure 13:
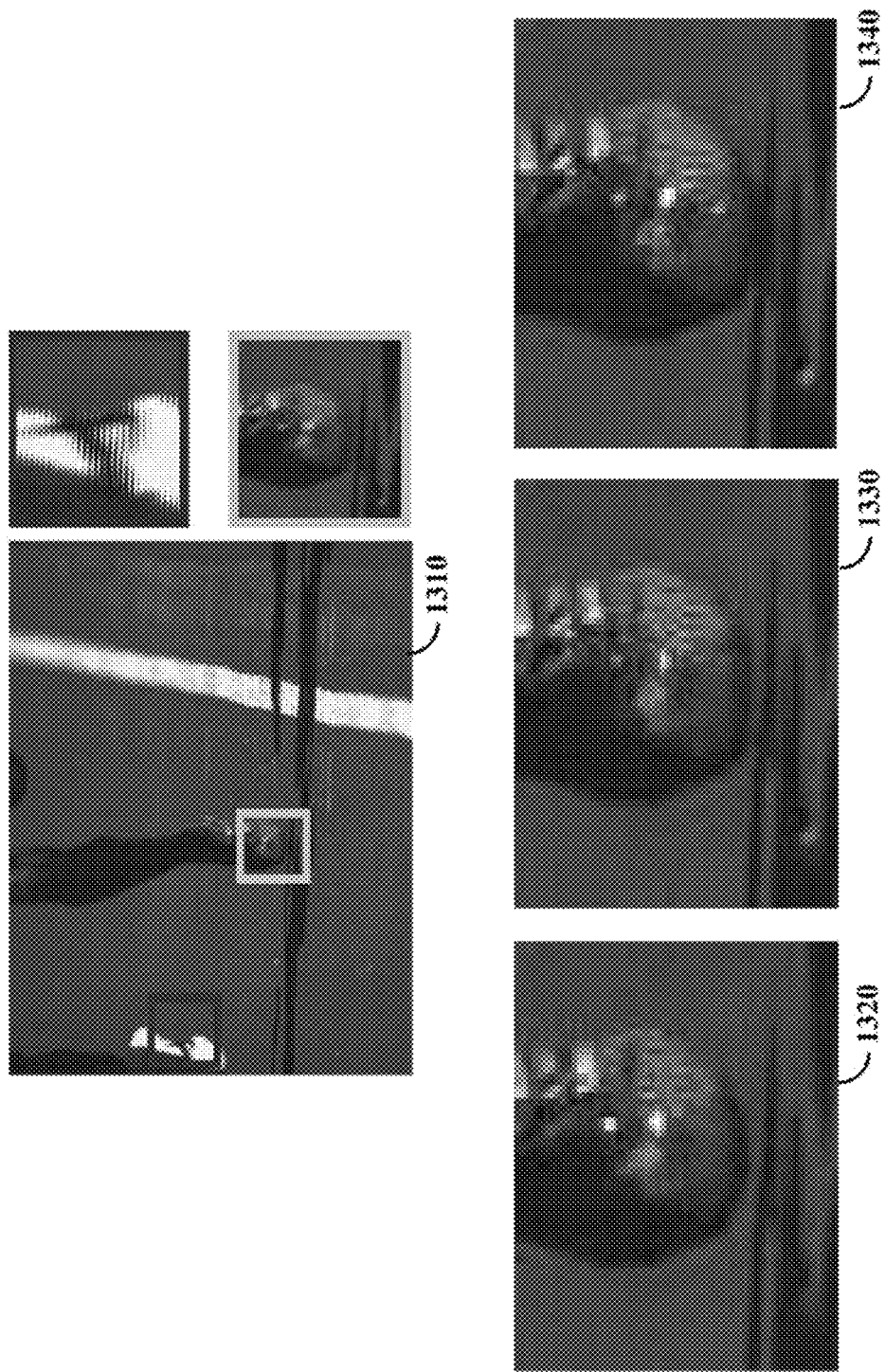
FIG. 13 illustrates examples of an input image and three sub-images obtained using the staggered readout pattern of FIG. 12B in accordance with some embodiments of the disclosed subject matter.

FIG. 13 illustrates an example of using staggered readout of FIG. 12B for an ultra-high speed photography application. As shown, a single image 1310 is captured using the staggered readout pattern. From single image 1310, eight sub-images are extracted using staggered readout pattern shown in FIG. 12B. Of the eight sub-images, three sub-images 1320, 1330, and 1340 are shown in FIG. 13—i.e., sub-image $I_1$, sub-image $I_4$, and sub-image $I_8$. Because of the substantially higher frame rate in the sub-images obtained from a single captured image, these sub-images can be used to capture the precise moment that the foot touches the ground. In addition, in some embodiments, sub-images $I_1$ through $I_8$ can be arranged to provide a smooth motion video that spans a short period of time (e.g., eight sub-images within one frame time).

Generally speaking, high dynamic range (HDR) imaging generally requires either multiple images of a particular scene that are taken with different exposures or specially-designed image sensors and/or hardware. Capturing multiple images of a particular scene with different exposures requires a static scene and a stable camera to avoid ghosting and/or motion blur. Specially-designed image sensors, on the other hand, are expensive. Accordingly, these generally make high dynamic range imaging inconvenient or impractical, especially for handheld consumer cameras.

In accordance with some embodiments, high dynamic range images can be obtained from a single captured image by controlling the exposure length, $\Delta t_e(y)$, for each row of the pixel array. Moreover, as described herein, by controlling readout timing, $\Delta t_r(y)$, and the exposure length, $\Delta t_e(y)$, for each row of the pixel array, high dynamic range images, where motion blur is substantially removed, can be obtained from a single captured image.

FIG. 14 illustrates an example of coded exposures for the different rows of a pixel array in accordance with some embodiments of the disclosed subject matter. Coded row-wise exposure, $\Delta t_e(y)$, can be used to alleviate the above-mentioned problems for high dynamic range imaging. The dynamic range of scene radiance can be better captured by either adaptively setting the exposure for each row or interlacing multiple exposures into a single image. This avoids taking multiple images of a particular scene and effectively reduces ghosting and motion blur due to camera shake.

Figure 15:
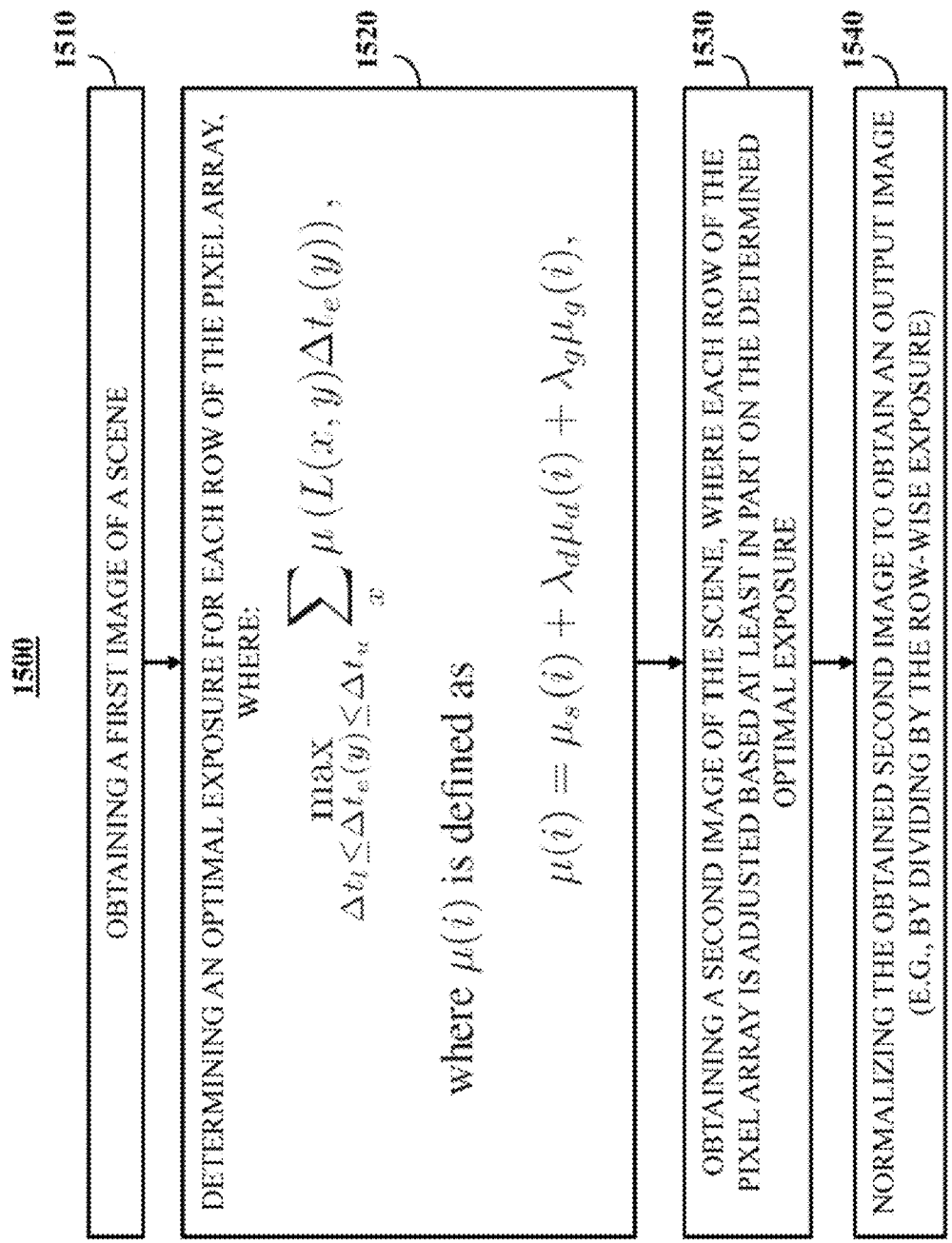
FIG. 15 illustrates a process for determining an optimal exposure for each row of the pixel array in accordance with some embodiments of the disclosed subject matter.

In some embodiments, an optimal exposure for each row of the pixel array can be determined (sometimes referred to herein as "adaptive row-wise auto-exposure") using a process 1500 as illustrated in FIG. 15. As shown, a temporary image of a scene (e.g., a physical object) is captured using an imaging device at 1510. This temporary image can be captured using, for example, an auto-exposure (AE) feature of the imaging device.

Figure 16:
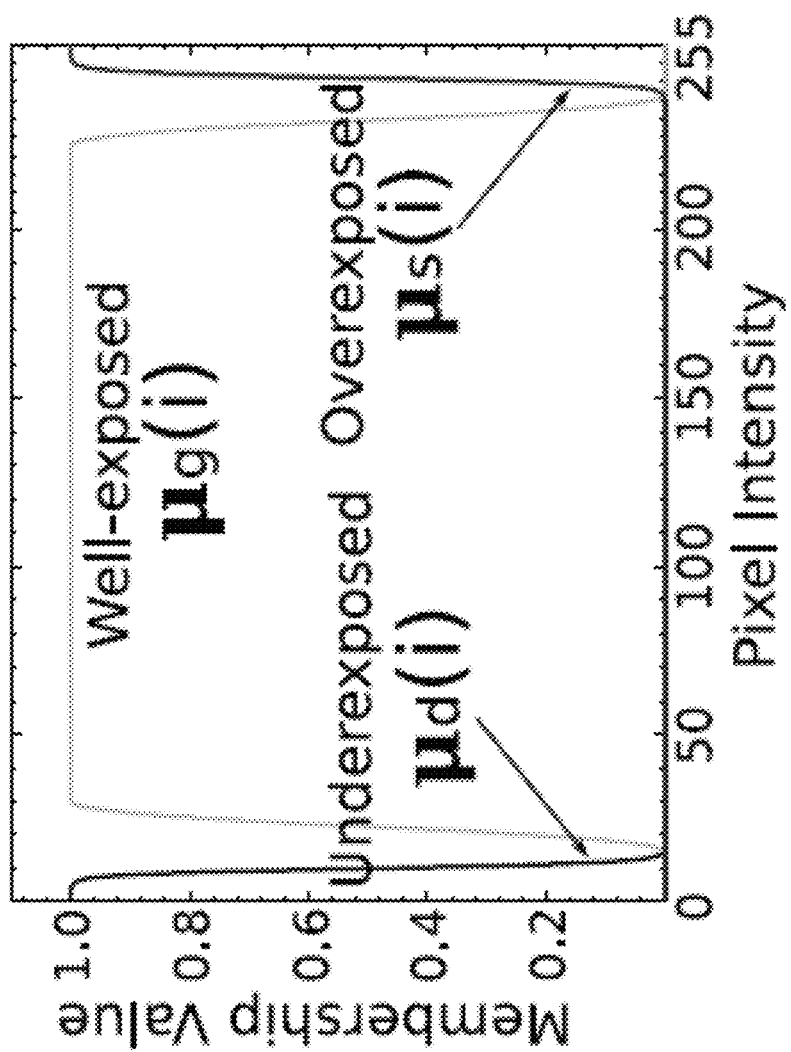
FIG. 16 illustrates a representation that includes membership functions used to describe the degree of being saturated, underexposed, or well-exposed in accordance with some embodiments of the disclosed subject matter.

In response to capturing the temporary image, an optimal exposure can be determined for each row of the pixel array at 1520. Generally speaking, an optimal exposure for a given row can be determined that minimizes the number of saturated and under-exposed pixels within the row while maintaining a substantially number of pixels well-exposed. As shown in FIG. 16, three membership functions—i.e., $\mu_s(i)$, $\mu_d(i)$, and $\mu_g(i)$—can be used to describe the degree of being overexposed or saturated ($\mu_s(i)$), underexposed ($\mu_d(i)$), or well-exposed ($\mu_g(i)$) for intensity, i. Scene radiance can be determined by $L=I_0(1+s\mu_s(I_0))$, where $s \geq 0$ is a scale factor used to estimate the scene radiance in saturated regions and $I_0$ is the temporary image.

It should be noted that scene radiance can be measured everywhere except in the saturated regions, where no information is recorded. It should also be noted that a small value for the scale factor, s, corresponds to a conservative auto-exposure algorithm.

Accordingly, the optimal exposure, $\Delta t_e(y)$, for the y-th row can be found by maximizing the following equation:

$$\max_{\Delta t_l \leq \Delta t_e(y) \leq \Delta t_u} \sum_x \mu(L(x, y)\Delta t_e(y))$$

where $\mu(i)$ can be defined as:

$$\mu(i) = \mu_s(i) + \lambda_d \mu_d(i) + \lambda_g \mu_g(i),$$

which includes weights $\lambda_d$ and $\lambda_g$ and lower and upper bounds of exposure adjustment $\Delta t_l$ and $\Delta t_u$.

Referring back to FIG. 15, upon determining the optimal exposure for each row by maximizing the above-mentioned equation and modifying the exposure times for each row of the pixel array (e.g., coded adaptive row-wise auto-exposure pattern shown in FIG. 14), a second image is captured, where each row of the pixel array has been adjusted for best capturing scene radiance at 1530.

In some embodiments, the second image ($I_c$) can be normalized to generate the final output image ($I_r$) at 1540. For example, in some embodiments, the second image can be normalized by dividing the second image by the row-wise exposure, $\Delta t_e(y)$. Accordingly:

$$I_r(x, y) = \frac{I_c(x, y)}{\Delta t_e(y)}$$

Figure 17:
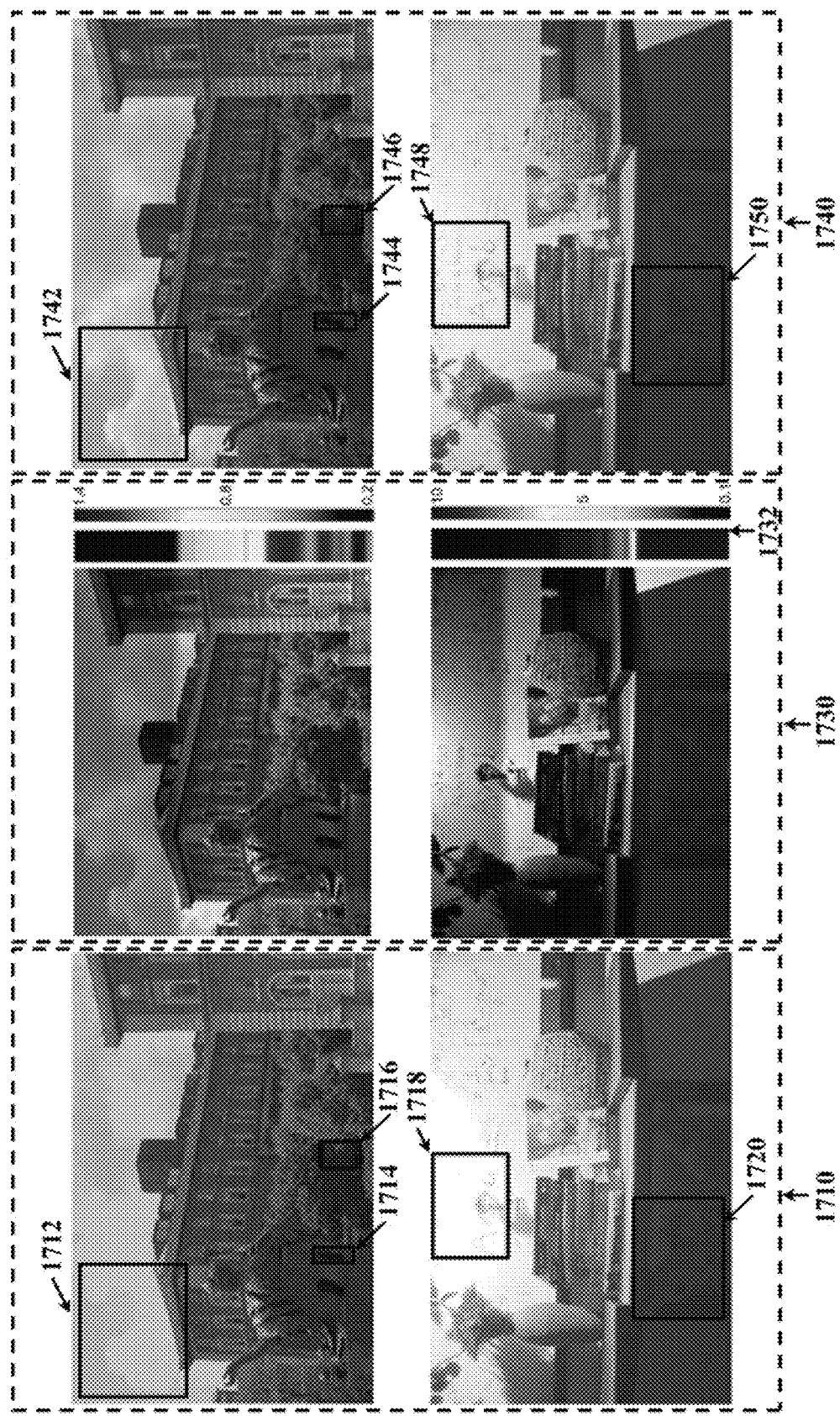
FIG. 17 illustrates examples of images obtained using conventional auto-exposure and the adaptive row-wise auto-exposure mechanism described in FIGS. 14 and 15 in accordance with some embodiments of the disclosed subject matter.
Figure 18:
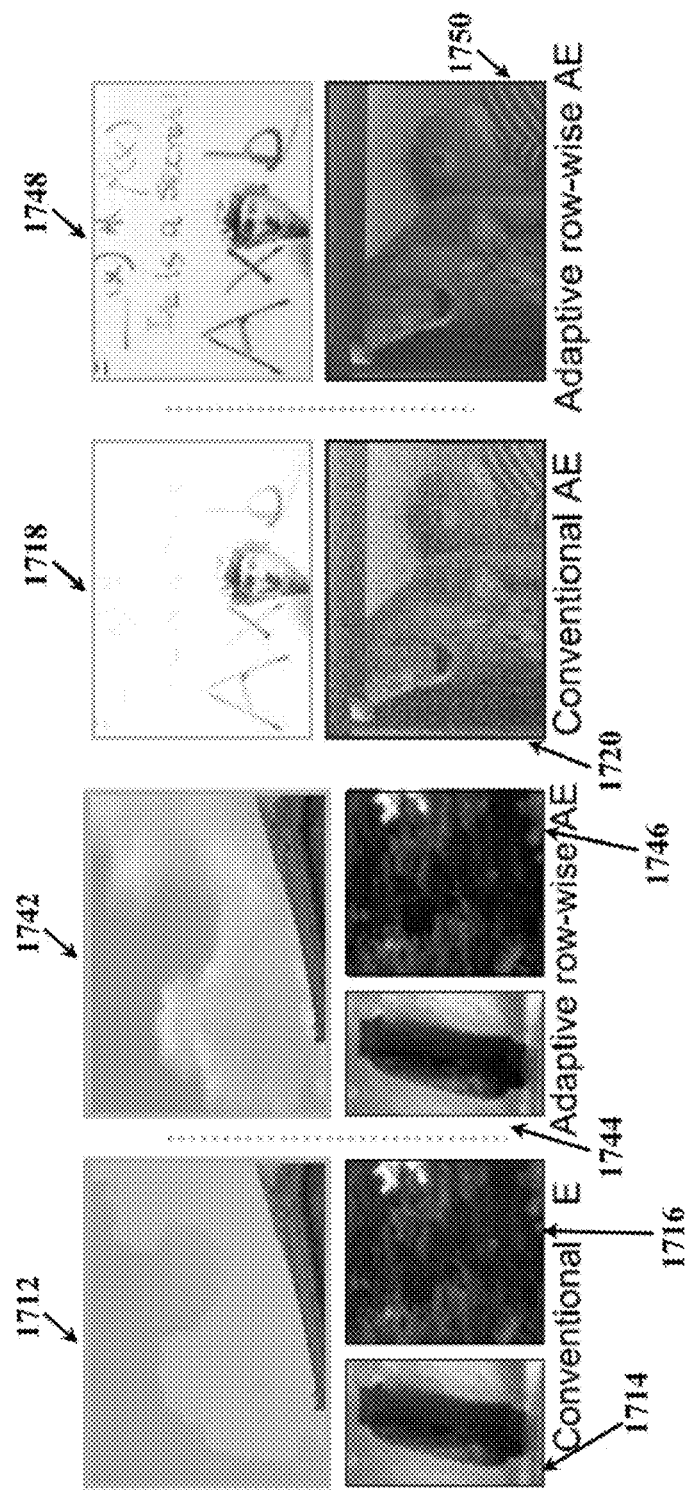
FIG. 18 illustrates examples of images showing that saturation and noise in dark regions are substantially suppressed in response to using the adaptive row-wise auto-exposure mechanism in accordance with some embodiments of the disclosed subject matter.

Illustrative examples of the images and exposures obtained using process 1500 of FIG. 15 are shown in FIGS. 17 and 18. Images 1710 show images obtained using conventional auto-exposure. Due to conventional auto-exposure, note the saturation in regions 1712 and 1718 and the noise in darkened regions 1714, 1716, and 1720. Images 1730 show an example of coded images ($I_c$) obtained using row-wise exposures 1732, which are displayed alongside images 1730. Upon normalizing images 1730, images 1740 are the final output images $I_r$. The output images have been normalized by dividing by the row-wise exposures 1732. FIG. 18 displays enlarged versions of regions 1712 through 1720 from images 1710 and regions 1742 through 1750 from images 1740. As shown, adaptive row-wise auto-exposure produces higher quality images, where the saturation (e.g., the clouds and the text shown in regions 1712, 1718, 1742, and 1748) and the noise in the dark regions (e.g., the statutes and the toys in regions 1714, 1716, 1720, 1744, 1746, and 1750) are substantially suppressed.

It should be noted that the adaptive row-wise auto-exposure mechanism described above requires little to no image processing. However, in some embodiments, additional post-processing, such as de-noising, can be performed. For example, noise amplification along the vertical direction, which can be derived from the exposure patterns, can be considered. In another example, for scenes where the dynamic range is predominantly spanned in the horizontal direction (e.g., a dark room that is being viewed from the outside), the adaptive row-wise auto-exposure mechanism can revert the imaging device to use a conventional auto-exposure feature.

In some embodiments, high dynamic range images can be obtained from a single captured image using the above-mentioned adaptive row-wise auto-exposure approach with the previously described coded readout pattern. Using adaptive row-wise auto-exposure to determine optimal exposure for each row in the pixel array along with a coded readout pattern, multiple exposures can be coded into a single captured image and planar camera motion can be estimated to remove blue due to camera shake.

Figure 19:
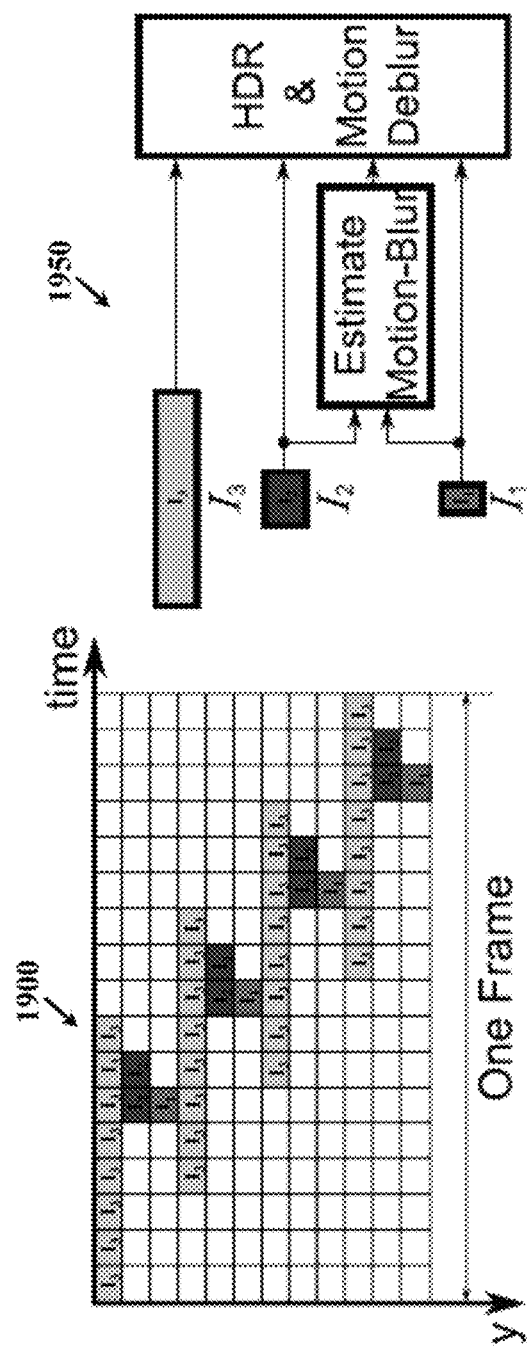
FIG. 19 illustrates a representation of a staggered readout and multiple exposure coding for high dynamic range imaging and a process for obtaining high dynamic range images and removing motion blur from information encoded in the sub-images in accordance with some embodiments of the disclosed subject matter.

FIG. 19 illustrates an example of a staggered readout and multiple exposure coding for high dynamic range imaging in accordance with some embodiments. As shown, the pixel array of an image sensor can be coded with staggered readout for three sub-images (K=3) and three exposures— i.e., $\Delta t_{e1}$, $\Delta t_{e2}$, and $\Delta t_{e3}$. Accordingly, from a single input image ($I_e$), three sub-images, $I_1$, $I_2$, and $I_3$, can be extracted. These sub-images can be resized vertically to full resolution using cubic interpolation or any other suitable interpolation approach.

These sub-images ($I_1$, $I_2$, and $I_3$) can be used to compose a high dynamic range image. For example, for static scenes/cameras, an output high dynamic range image can be produced by combining the sub-images of multiple exposures.

In addition, in some embodiments, these sub-images ($I_1$, $I_2$, and $I_3$) obtained from using coded pattern 1900 can be used to compose a high dynamic range and remove motion blur due to camera shake as shown in process flow 1950. For example, motion blur due to camera shake is a common problem in photography and the compact form and small lenses of handheld digital cameras only services to increase the camera shake problem. For handheld digital cameras, motion blur in images caused by camera shake is inevitable, especially for long exposure times. Accordingly, in some embodiments, where camera shake is an issue, optical flow can be determined between the sub-images to account for the camera shake.

It should be noted that, as the sub-images are obtained using a staggered readout, the time lag between the sub-images is small. Therefore, the camera shake velocity can generally be the same in the sub-images. It should be also noted that, within one frame time, the amount of motion caused by camera shake is small and can be approximated as a planar motion.

In some embodiments, the sub-images, which are sampled at different timings, and the estimated optical flow from the sub-images can be used to remove motion blur from a single image caused by camera shake or any other suitable motion as shown in flow 1950. A motion vector, $\vec{u}=[u_x, u_y]$, can be estimated from sub-images $I_1$ and $I_2$ by the estimated optical flow:

$$\vec{u} = \text{average}(\text{computeFlow}(I_1, I_2 - I_1))$$

The motion vector can be used determine blur kernels. More particularly, by de-blurring two composed images, $I_1 \oplus I_2$ and $I_1 \oplus I_2 \oplus I_3$, ringing can be effectively suppressed, where the operator $\oplus$ denotes that the images are first center-aligned with the motion vector, $\vec{u}$, and then added together. The two de-blurred images can be represented as:

$$I_{b1} = \text{deblur}(I_1 \oplus I_2, \vec{u}, \Delta t_{e1}, \Delta t_{e2})$$

$$I_{b2} = \text{deblur}(I_1 \oplus I_2 \oplus I_3, \vec{u}, \Delta t_{e1}, \Delta t_{e2}, \Delta t_{e3})$$

Accordingly, the output de-blurred high dynamic range (HDR) image can be calculated by the following:

$$I_r \left( \frac{I_1}{\Delta t_{e1}} + \frac{I_{b1}}{\Delta t_{e1} + \Delta t_{e2}} + \frac{I_{b2}}{\Delta t_{e1} + \Delta t_{e2} + \Delta t_{e3}} \right) / 3$$

It should be noted that the optimal exposure ratios $\Delta t_{e3}$: $\Delta t_{e2}$:$\Delta t_{e1}$ (e.g., $8\Delta t_{e1}$:$2 \Delta t_{e1}$:$\Delta t_{e1}$) can be determined based at least in part on the desired extended dynamic range and the noise amplification due to motion de-blurring. For example, a larger $\Delta t_{e3}$:$\Delta t_{e1}$ exposure ratio provides a larger extended dynamic range, but can also amplify noise during motion de-blurring.

Figure 20:
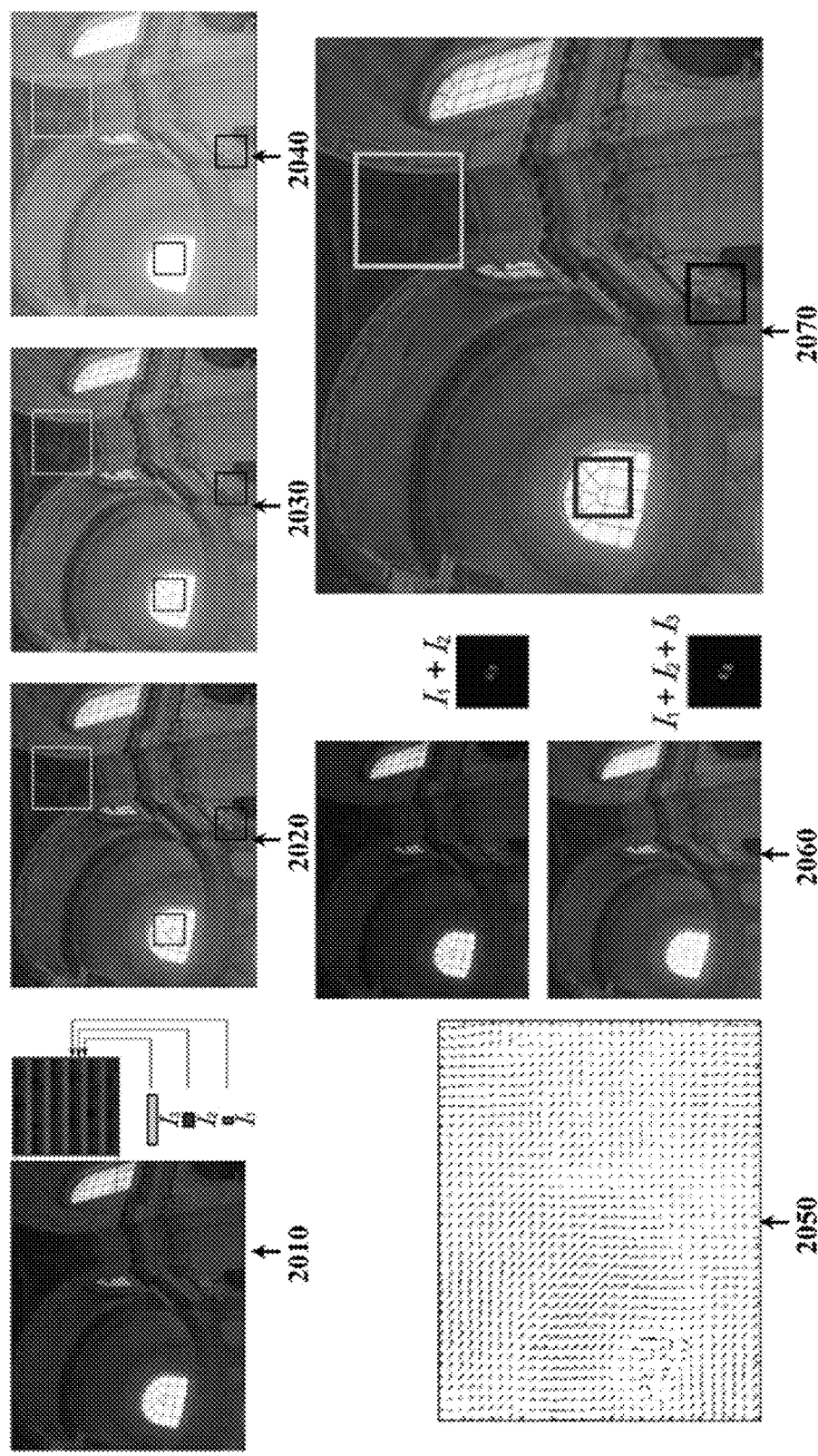
FIG. 20 illustrates examples of an input image, multiple sub-images, a representation of the estimated optical flow, blur kernels, and an output image obtained using the coded pattern of FIG. 19 in accordance with some embodiments of the disclosed subject matter.

Illustrative examples of the coded input image, sub-images, and output high dynamic range image obtained using the staggered readout and multiple exposure coding 1900 of FIG. 19 are shown in FIG. 20. Image 2010 is the input image ($I_e$) that is generated according to the coding pattern 1900 of FIG. 19. Images 2020, 2030, and 2040 are the sub-images ($I_1$, $I_2$, and $I_3$) extracted from input image 2010. It should be noted that each sub-image 2020, 2030, and 2040 has a different exposure length to extend the dynamic range. However, for this particular scene, it should also be noted that each sub-image has portions that are dark and noisy, blurry, and/or saturated. For example, as sub-images 2020 and 2030 have shorter exposure times than sub-image 2040, sub-images 2020 and 2030 have greater noise than sub-image 2040. On the other hand, as the exposure time for sub-image 2040 is longer, portions of sub-image 2040 are saturated and exhibit motion blur. Using sub-images 2020 and 2030, the optical flow 2050 can be estimated and blur kernels and de-blurred images can be obtained at 2060. Using the sub-images to remove motion blur caused by camera shake and combining the sub-images of multiple exposures, a high dynamic range output image 2070 can be recovered. It should be noted that high dynamic range image 2070 is substantially higher in quality than an image obtained using conventional rolling shutter and substantially higher in quality than any of the sub-images alone. Accordingly, a larger dynamic range is preserved and motion blur caused by camera shake is effectively removed.

Figure 21:
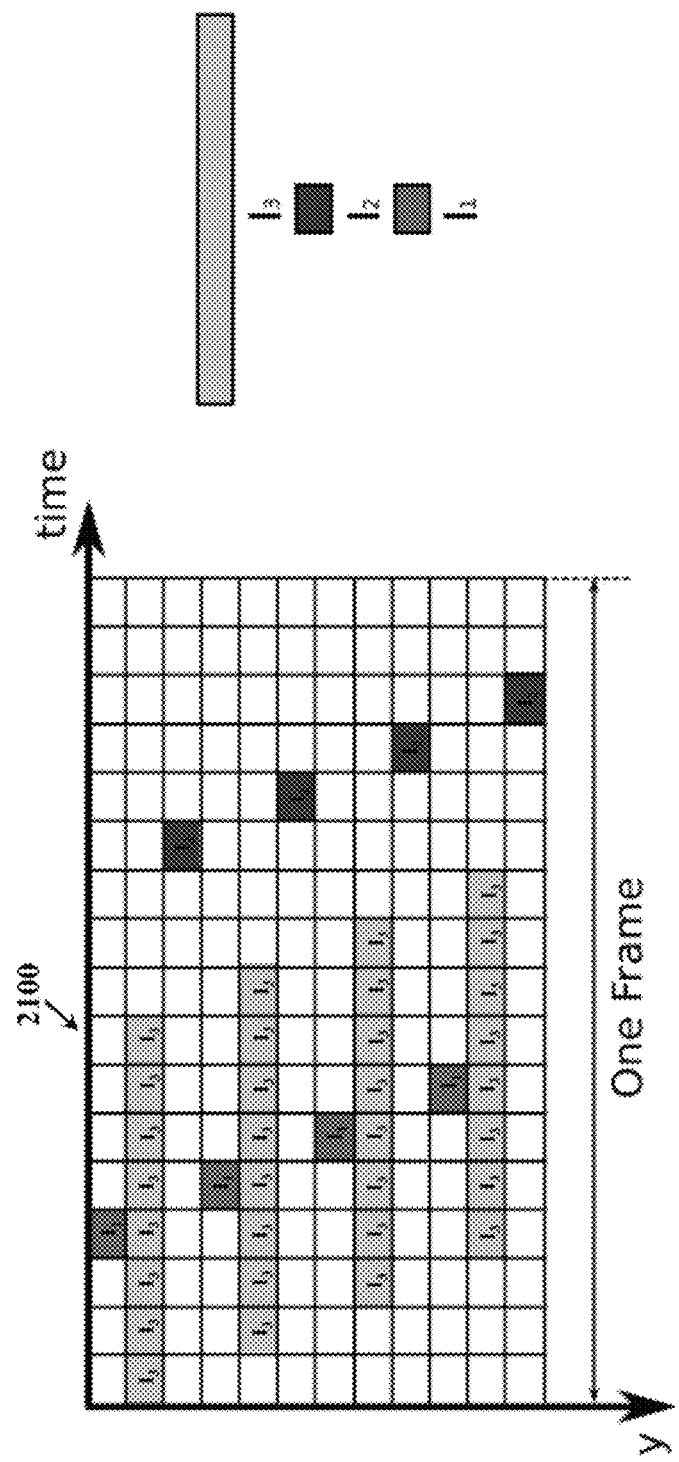
FIG. 21 illustrates an alternative representation of an interlaced readout and multiple exposure coding for high dynamic range imaging in accordance with some embodiments of the disclosed subject matter.

Although FIG. 19 describes the use of staggered readout and multiple exposure coding for obtaining a high dynamic range image, it should be noted that any suitable coded shutter pattern can be used. For example, FIG. 21 illustrates another coding pattern for high dynamic range imaging. Unlike pattern 1900 shown in FIG. 19, pattern 2100 shows an interlaced readout and multiple exposure coding for high dynamic range imaging. In particular, an image sensor that uses coded pattern 2100 obtains three sub-images ($I_1$, $I_2$, and $I_3$) with two different exposures, $\Delta t_{e1}$ and $\Delta t_{e2}$. It should be noted that the exposure lengths for sub-images $I_1$ and $I_2$ are the same. Similarly, optical flow can be estimated from sub-images $I_1$ and $I_2$ as the time lag between the sub-images is small. In response, the estimated the optical flow can be used to remove motion blur from sub-image $I_3$, which has a longer exposure time than sub-images $I_1$ and $I_2$.

It should be noted that, as described above in connection with interlaced readout patterns, the sub-images obtained using coded pattern 2100 has substantially reduced skew than images obtained using conventional rolling shutter.

Accordingly, coded pattern 2100 of FIG. 21 can be used for high dynamic range imaging of moving objects.

In accordance with some embodiments, mechanisms are provided for controlling exposure length and readout times that can recover a skew-free video from a single captured image. Generally speaking, by modeling the scene brightness for one pixel (x,y) over time t as a one-dimensional signal, the corresponding pixel intensity in the captured image is a linear projection of this one-dimensional signal with the exposure pattern. Accordingly, with randomly coded exposure patterns, space-time volume (e.g., a skew-free video) can be reconstructed from a single captured image by exploiting the sparsity in signal gradients.

In a more particular example, a skew-free video can be recovered from a single captured image using compressive sensing techniques. Compressive sensing techniques provide an approach for reconstructing sparse signals from far fewer samples than required by other techniques, such as the Shannon sampling theorem. As described above, the captured image I (x,y) can be described as a line-integral measurement of the space-time volume E (x,y,t). Accordingly, by controlling the shutter function, S (x,y,t), from a single image, several measurements can be acquired within neighboring rows to recover the space-time volume E (x,y,t).

Consider the time-varying appearance of a given pixel (x,y) within one time frame E (x,y,t), where $0 \leq t \leq M\Delta t_r$. This can be discretized into a P-element vector, where $$x = \left[ E\left(x, y, \frac{M\Delta t_r}{P}\right), E\left(x, y, \frac{2M\Delta t_r}{P}\right), \ldots, E(x, y, M\Delta t_r) \right]^T$$

Figure 22:
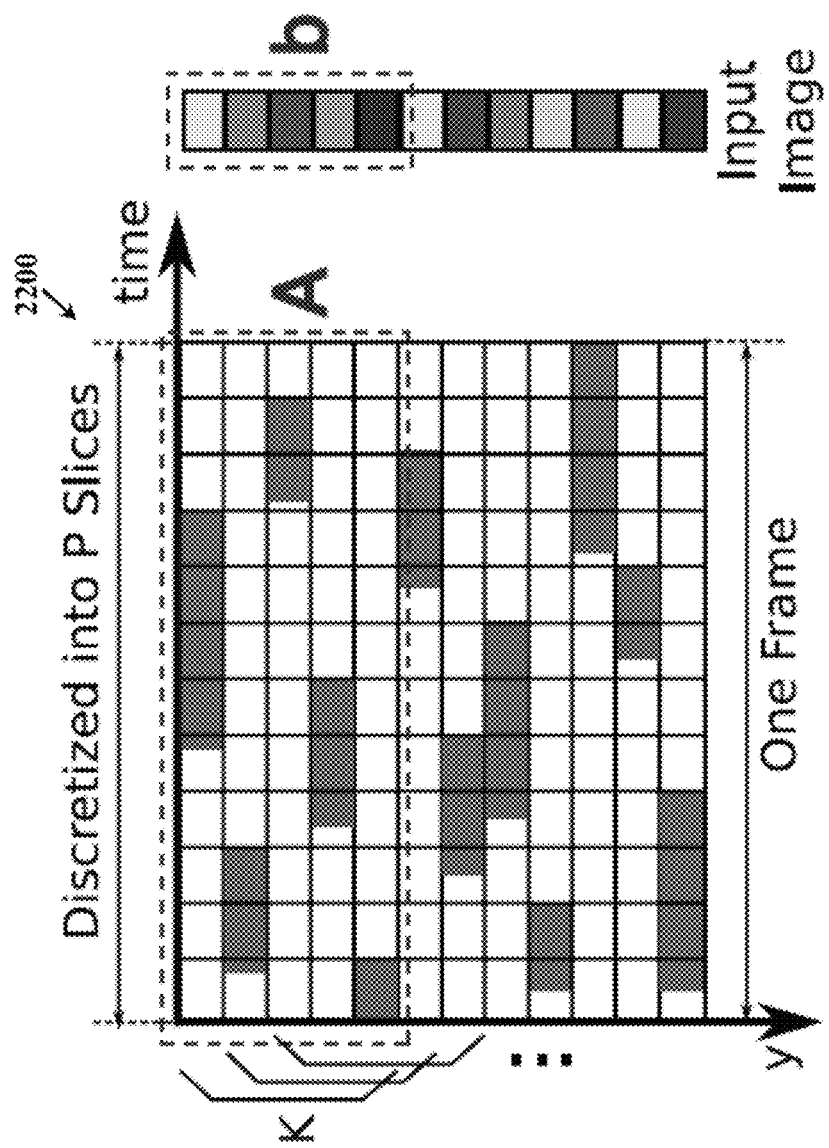
FIG. 22 illustrates a representation of a coded rolling shutter pattern for recovering a skew-free video from a single captured image in accordance with some embodiments of the disclosed subject matter.

As shown in the coded pattern 2200 of FIG. 22, to reconstruct x from a single captured image, vertical image resolution is traded off and multiple measurements from the K neighboring rows are obtained. It should be noted that this generally assumes that the appearance is similar within a given locality. The reconstruction can be performed every K rows within a sliding window.

If b denotes the intensities of the K neighboring pixels in the input image I, b can be represented as:

$$b = \left[ I\left(x, y - \frac{K}{2}\right), \ldots, I\left(x, y + \frac{K}{2} - 1\right) \right]^T$$

Accordingly, Ax=b, where A is a K×P matrix representing the coding patterns.

The process for recovering a skew-free video from a single captured image begins by obtaining an initial estimate $E_0$ using, for example, block matching and linear interpolation. In a more particular example, the input image can be normalized by dividing by the exposure such that: $I_n(x,y) = I(x,y)/\Delta t_e(y)$. Each pixel (x,y) in the normalized image (In) corresponds to a set of sampled voxels in the initial estimate, $E_0(x,y,t)$, where $t_s(y) \leq t \leq t_r(y)$. These sampled voxels can be used to fill in portions of the initial estimate, $E_0$.

Figure 23:
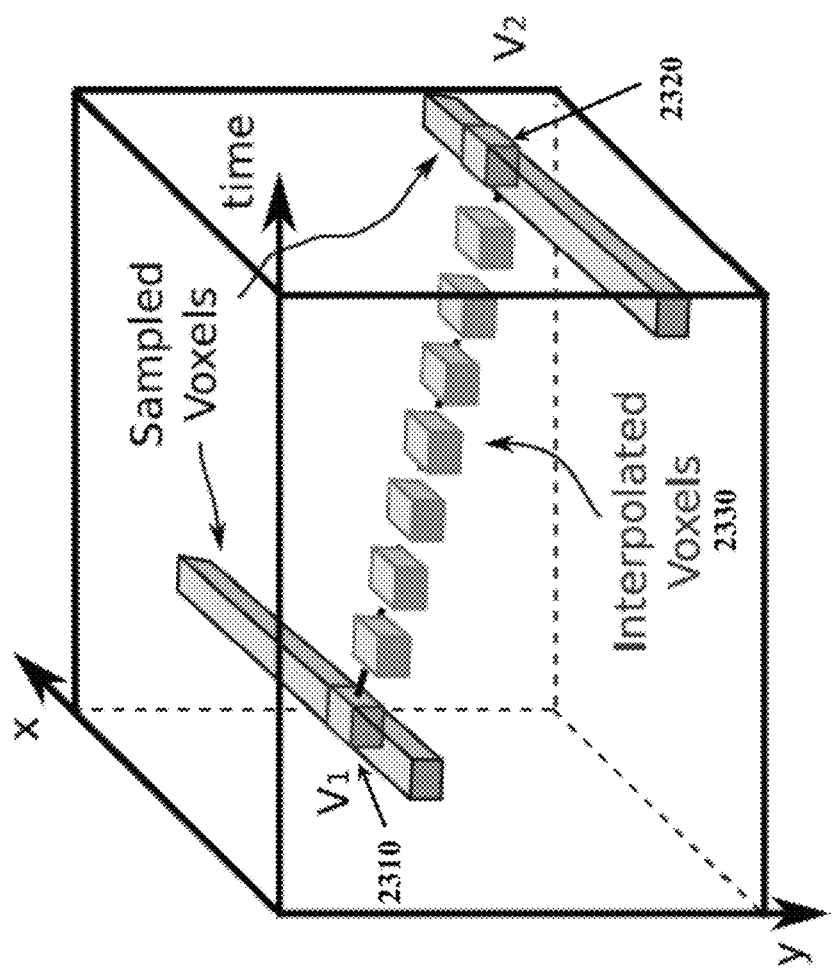
FIG. 23 illustrates a representation of a voxel and searching for a matching voxel for reconstructing the time-varying appearance for each pixel in accordance with some embodiments of the disclosed subject matter.

FIG. 23 illustrates sampled voxels in accordance with some embodiments of the disclosed subject matter. For each sampled voxel, such as voxel 2310 ($v_1 = (x_1, y_1, t_1)$), a search is conducted through the other sampled voxels to find a suitable matching voxel, such as voxel 2320 ($v_2 = (x_2, y_2, t_2)$). It should be noted that the matching voxel can be selected such that error is minimized. For example, in one suitable approach, error can be described as $|N_x(v_1) - N_x(v_2)|$, where $N_x(v)$ denotes the neighborhood of voxel v in the x-direction. If the minimum error is greater than a preset or predetermined threshold, no suitable matching voxel is found. For each matched pair of voxels, the voxels between the matched pair of voxels can be interpolated as shown by the interpolated voxels 2330 in FIG. 23.

In some embodiments, a particular voxel can be interpolated multiple times. If a particular voxel is interpolated multiple times, the value of that voxel can be set to the result computed from the matched pair with the minimum matching error. This fills in a substantial portion of the initial estimate, $E_0$. The remaining voxels can then be initialized to the values in the normalized image ($I_n(x,y)$) at the corresponding rows.

The initial estimate, $E_0$, can then be used to reconstruct the time-varying appearance x for each pixel by exploiting the sparsity in the gradient of the pixel's radiance over time:

$$\min |x'| + \lambda |x - x_0|$$

where |x'| is the L−1 norm of the gradient of x over time, λ is a weight parameter, and $x_0$ is the corresponding signal in $E_0$. An optimization using the initial estimate can be run multiple times (e.g., twice). The output of the first iteration can be used to adaptively adjust the values of K for different rows. It should be noted that for rows with large variance in the recovered appearance over time, the K value can be lowered, and vice versa. The adjustment is performed based on a precomputed or predetermined mapping between K values, variances of appearance over time, and reconstruction errors. Multiple iterations can continue to be performed and, in some embodiments, a median filter can be applied prior to generating the final output.

Figure 24:
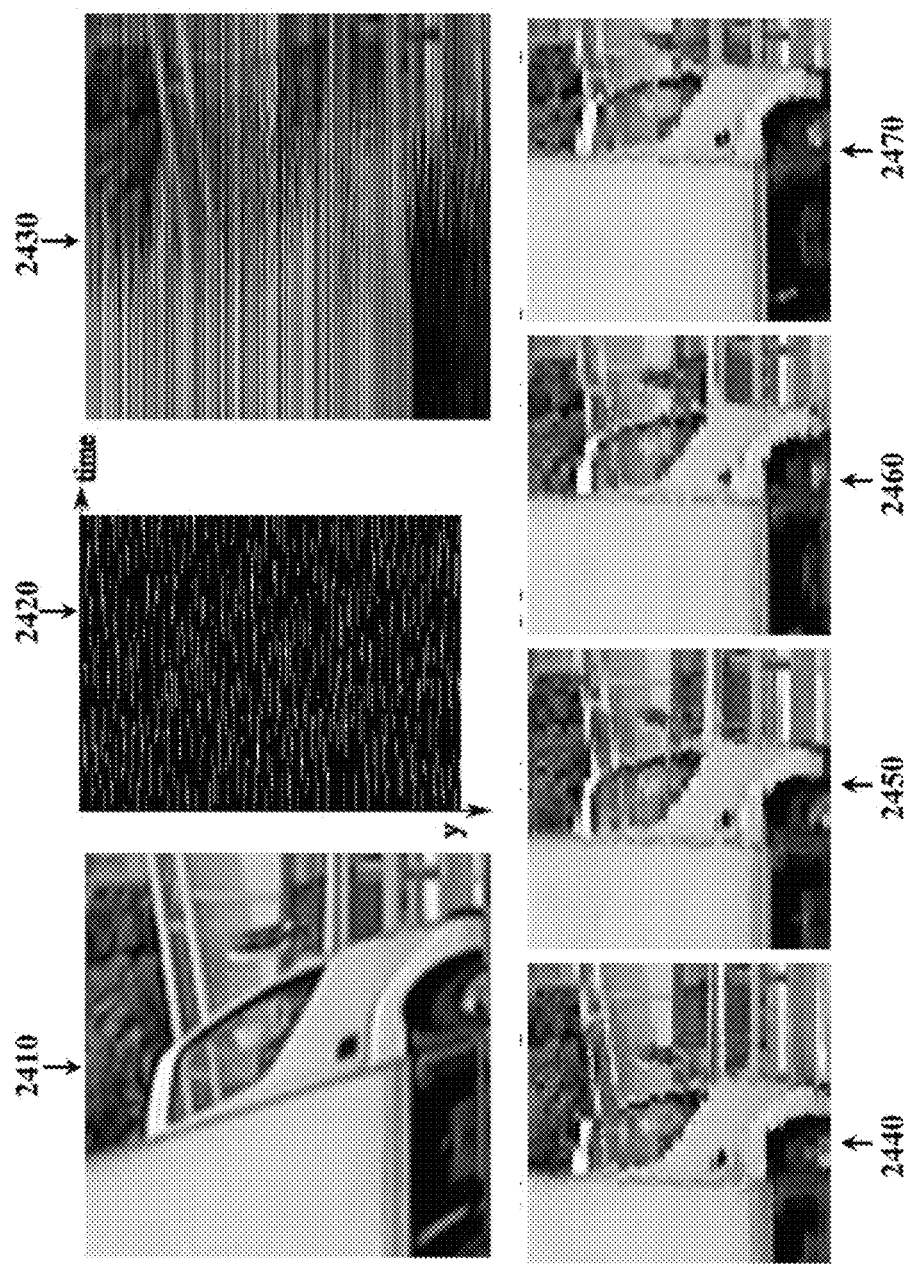
FIG. 24 illustrates examples of multiple slices at particular points in time of the skew-free video recovered from a single captured image in accordance with some embodiments of the disclosed subject matter.

FIG. 24 illustrates examples of multiple slices at particular points in time of the skew-free video. Image 2410 shows an image of a moving truck taken using conventional rolling shutter. As described previously, there is substantial skew exhibited in image 2410. Image 2430 shows a coded input image obtained using obtained using a coding pattern 2420. In some embodiments, coding pattern 2420 can include a randomly coded exposure pattern. Using the approach described above, a skew-free video is reconstructed from input image 2430 by exploiting the sparsity in signal gradients. Images 2440, 2450, 2560, and 2470 illustrate slices taken from the reconstructed skew-free video at particular points in time. It should be noted that each of the images from the skew-free video exhibits substantially reduced skew when compared to image 2410, which was obtained using conventional rolling shutter.

Figure 25:
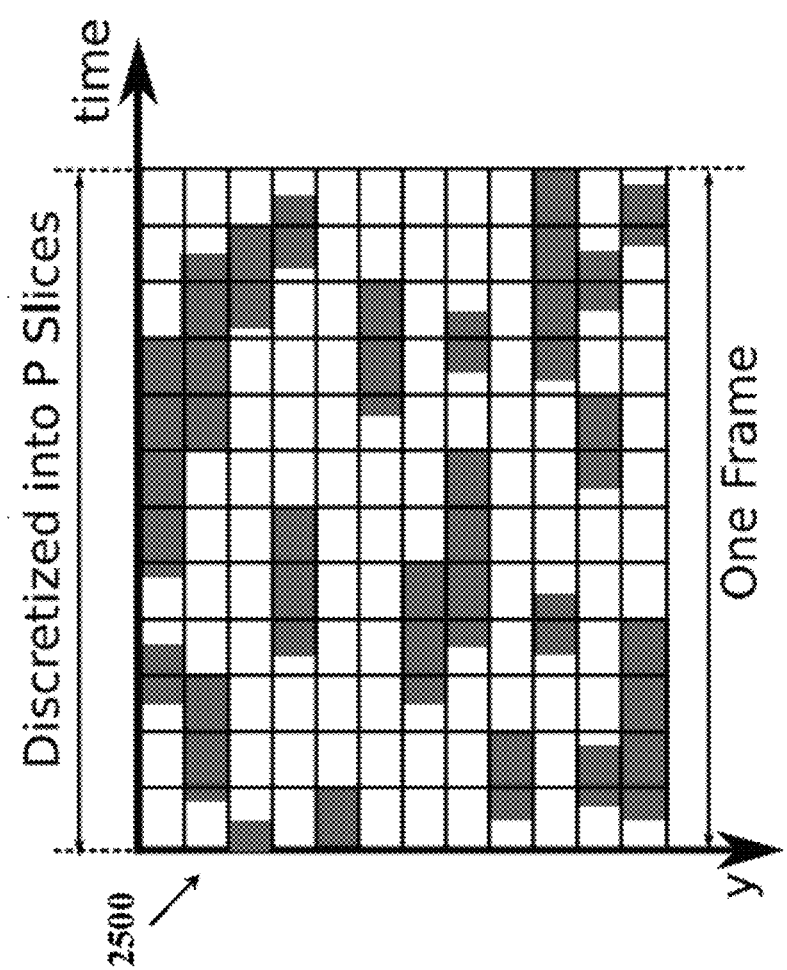
FIG. 25 illustrates a representation of a coded rolling shutter pattern that implements intermittent exposure for recovering a skew-free video from a single captured image in accordance with some embodiments of the disclosed subject matter.

In some embodiments, if a frame buffer is available on the CMOS image sensor, intermittent exposures can be implemented for each pixel, where each pixel can receive multiple row-select and row-reset signals during one frame as shown in FIG. 25. As illustrated in coding pattern 2500, the intermittent exposure allows more complex coding patterns for reconstruction via compressive sensing and, in some embodiments, can achieve better reconstruction results. In addition to correcting for geometric skew, such as geometric distortion of moving options, the proposed coding patterns can be used to compensate for photometric skew, such as the partial exposure caused by uncontrollable flashes.

In some embodiments, hardware used in connection with the coded mechanisms can include an image capture device. The image capture device can be any suitable device for capturing images and/or video, such as a portable camera, a video camera or recorder, a computer camera, a scanner, a mobile telephone, a personal data assistant, a closed-circuit television camera, a security camera, an Internet Protocol camera, etc.

The image capture device can include an image sensor, such as the image sensor shown in FIG. 1. As shown, image sensor 100 includes a pixel array 105 having multiple rows of pixels and an address generator 110. The coded rolling shutter mechanisms can be implemented by modifying the logic of a control unit, such as address generator 110, in the CMOS image sensor of FIG. 1 and without any further hardware modification. More particularly, the logic of address generator can be implemented such that it generates particular row-reset and row-select patterns for coded readout and exposure. Alternatively, an external field-programmable gate array (FPGA) can be used to modify the image sensor.

In some embodiments, the hardware can also include an image processor. The image processor can be any suitable device that can process images and image-related data as described herein. For example, the image processor can be a general purpose device such as a computer or a special purpose device, such as a client, a server, an image capture device (such as a camera, video recorder, scanner, mobile telephone, personal data assistant, etc.), etc. It should be noted that any of these general or special purpose devices can include any suitable components such as a processor (which can be a microprocessor, digital signal processor, a controller, etc.), memory, communication interfaces, display controllers, input devices, etc.

In some embodiments, the hardware can also include image storage. The image storage can be any suitable device for storing images such as memory (e.g., non-volatile memory), an interface to an external device (such as a thumb drive, a memory stick, a network server, or other storage or target device), a disk drive, a network drive, a database, a server, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods and systems for coded readout of an image are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for reading an image of a scene detected in an image sensor having an array containing a plurality of pixels, the method comprising:
   obtaining first image data from a first subset of rows of the array to extract a first sub-image of the scene;
   obtaining second image data from a second subset of rows of the array to extract a second sub-image of the scene, wherein the first subset of rows is different from the second subset of rows;
   determining flow information based on a motion of brightness patterns between the first sub-image and the second sub-image or determining the flow information by comparing a position of particular points in the first sub-image and the second sub-image;
   estimating a point spread function for the image based, at least in part, on the determined flow information; and
   generating a video based, at least in part, on the first sub-image, the second sub-image, and the estimated point spread function.

2. The method of claim 1, wherein a plurality of sub-images that includes the first sub-image and the second sub-image extracted from the image are uniformly distributed between the plurality of rows of the array.

3. The method of claim 1, wherein determining flow information further comprises estimating the optical flow between the first sub-image and the second sub-image.

4. The method of claim 1, further comprising determining an intermediate image that is interpolated between the first sub-image and the second sub-image.

5. The method of claim 4, wherein the first sub-image, the intermediate image, and the second sub-image are combined to create the video.

6. The method of claim 1, further comprising:
   receiving a coded pattern for reading the plurality of rows of the array, wherein the coded pattern is an interlaced pattern in which readout time for each row is uniformly distributed into the plurality of sub-images.

7. The method of claim 1, further comprising:
   receiving a coded pattern for reading the plurality of rows of the array, wherein the coded pattern is a staggered pattern in which an order of reading out a subset of the plurality of rows is reversed for the subset.

8. A method for reading an image of a scene detected in an image sensor comprising an array having a plurality of rows of pixels, the method comprising:
   obtaining a first image of the scene at a first exposure;
   determining an adjusted exposure time for each of the plurality of rows of the array based at least in part on scene radiance in the first image of the scene, wherein the adjusted exposure time includes a first exposure time for a first row of the plurality of rows and a second exposure time for a second row of the plurality of rows and wherein the first exposure time is adjusted to be different from the second exposure time;
   obtaining a second image of the scene using the first exposure time for the first row of the plurality of rows of the array and the second exposure time for the second row of the plurality of rows of the array; and
   generating a high dynamic range image based on image data from at least the first row and the second row of the plurality of rows.

9. The method of claim 8, further comprising normalizing image data of the second image of the scene with respect to the adjusted exposure time applied to each of the plurality of rows of the array.

10. The method of claim 8, further comprising determining readout times of the plurality of rows of the array.

11. The method of claim 10, further comprising extracting a plurality of sub-images from the image using the determined readout times and the adjusted exposure times, wherein the plurality of sub-images are uniformly distributed between the plurality of rows in the array.

12. The method of claim 11, further comprising:
estimating optical flow between a first sub-image and a second sub-image of the plurality of sub-images, wherein estimating the optical flow comprises estimating the optical flow based on a motion of brightness patterns between the first sub-image and the second sub-image or estimating the optical flow by comparing a position of particular points in the first sub-image and the second sub-image;
determining motion information based at least in part on the estimated optical flow; and
applying the determined motion information to enhance the high dynamic range image that is generated by combining the plurality of sub-images extracted from the image.

13. A system for reading an image of a scene, the system comprising:
an image sensor comprising an array having a plurality of rows; and
at least one processor programmed to:
obtain first image data from a first subset of rows of the array to extract a first sub-image of the scene;
obtain second image data from a second subset of rows of the array to extract a second sub-image of the scene, wherein the first subset of rows is different from the second subset of rows;
determine flow information based on a motion of brightness patterns between the first sub-image and the second sub-image or determining the flow information by comparing a position of particular points in the first sub-image and the second sub-image;
estimate a point spread function for the image based, at least in part, on the determined flow information; and
generate a video based, at least in part, on the first sub-image, the second sub-image, and the estimated point spread function.

14. The system of claim 13, wherein a plurality of sub-images that includes the first sub-image and the second sub-image extracted from the image are uniformly distributed between the plurality of rows of the array.

15. The system of claim 13, wherein the processor is further configured to estimate the optical flow between the first sub-image and the second sub-image.

16. The system of claim 13, wherein the processor is further configured to determine an intermediate image that is interpolated between the first sub-image and the second sub-image.

17. The system of claim 16, wherein the first sub-image, the intermediate image, and the second sub-image are combined to create the video.

18. The system of claim 14, wherein the processor is further configured to:
receive a coded pattern for reading the plurality of rows of the array, wherein the coded pattern is an interlaced pattern in which readout time for each row is uniformly distributed into the plurality of sub-images.

19. The system of claim 14, further comprising:
receive a coded pattern for reading the plurality of rows of the array, wherein the coded pattern is a staggered pattern in which an order of reading out a subset of the plurality of rows is reversed for the subset.

20. A system for reading an image of a scene, the system comprising:
an image sensor comprising an array having a plurality of rows; and
at least one processor programmed to:
obtain a first image of the scene at a first exposure;
determine an adjusted exposure time for each of the plurality of rows of the array based at least in part on scene radiance in the first image of the scene, wherein the adjusted exposure time includes a first exposure time for a first row of the plurality of rows and a second exposure time for a second row of the plurality of rows and wherein the first exposure time is adjusted to be different from the second exposure time;
obtain a second image of the scene using the first exposure time for the first row of the plurality of rows of the array and the second exposure time for the second row of the plurality of rows of the array; and
generate a high dynamic range image based on image data from at least the first row and the second row of the plurality of rows.

21. The system of claim 20, wherein the at least one processor is further programmed to normalize image data of the second image of the scene with respect to the adjusted exposure time applied to each of the plurality of rows of the array.

22. The system of claim 20, wherein the at least one processor is further programmed to determine readout times of the plurality of rows of the array.

23. The system of claim 22, wherein the at least one processor is further programmed to extract a plurality of sub-images from the image using the determined readout times and the adjusted exposure times, wherein the plurality of sub-images are uniformly distributed between the plurality of rows in the array.

24. The system of claim 23, wherein the at least one processor is further programmed to:
estimate optical flow between a first sub-image and a second sub-image of the plurality of sub-images, wherein estimating the optical flow comprises estimating the optical flow based on a motion of brightness patterns between the first sub-image and the second sub-image or estimating the optical flow by comparing a position of particular points in the first sub-image and the second sub-image;
determine motion information based at least in part on the estimated optical flow; and
apply the determined motion information to enhance the high dynamic range image that is generated by combining the plurality of sub-images extracted from the image.

* * * * *